United States Patent
Kamoshida et al.

(10) Patent No.: US 10,047,984 B2
(45) Date of Patent: Aug. 14, 2018

(54) EVAPORATOR

(75) Inventors: Osamu Kamoshida, Oyama (JP);
Naohisa Higashiyama, Oyama (JP);
Motoyuki Takagi, Oyama (JP);
Takashi Hirayama, Oyama (JP)

(73) Assignee: KEIHIN THERMAL TECHNOLOGY CORPORATION, Oyama-Shi (JP)

( * ) Notice: Subject to any disclaimer, the term of this patent is extended or adjusted under 35 U.S.C. 154(b) by 1898 days.

(21) Appl. No.: 13/067,399

(22) Filed: May 31, 2011

(65) Prior Publication Data
US 2011/0303401 A1 Dec. 15, 2011

(30) Foreign Application Priority Data

Jun. 11, 2010 (JP) .................................. 2010-134100
Jul. 30, 2010 (JP) .................................. 2010-172038
Apr. 15, 2011 (JP) .................................. 2011-090845

(51) Int. Cl.
*F28D 7/16* (2006.01)
*F28F 9/02* (2006.01)
(Continued)

(52) U.S. Cl.
CPC ....... *F25B 39/022* (2013.01); *B60H 1/00335* (2013.01); *F28D 1/05391* (2013.01);
(Continued)

(58) Field of Classification Search
CPC ............. F28D 1/05308; F28D 1/05358; F28D 1/0408; F28D 1/0417; F28D 1/0435;
(Continued)

(56) References Cited

U.S. PATENT DOCUMENTS

| | | | | |
|---|---|---|---|---|
| 6,742,577 | B2 * | 6/2004 | Joboji | F28D 1/0333 165/153 |
| 7,107,787 | B2 * | 9/2006 | Inaba | F25B 39/022 165/176 |
| 7,222,663 | B2 * | 5/2007 | Higashiyama | F28D 1/0333 165/153 |
| 2005/0039895 | A1 * | 2/2005 | Inaba | F28D 1/0341 165/153 |
| 2008/0023185 | A1 * | 1/2008 | Beamer | F28D 1/05375 165/174 |
| 2009/0166017 | A1 * | 7/2009 | Katoh | F28D 1/05358 165/153 |
| 2010/0031698 | A1 | 2/2010 | Higashiyama | |

(Continued)

FOREIGN PATENT DOCUMENTS

| | | |
|---|---|---|
| JP | 2001-74388 | 3/2001 |
| JP | 2008-267764 | 11/2008 |

(Continued)

OTHER PUBLICATIONS

Japanese Office Action for corresponding JP Application No. 2010-134100, dated Mar. 4, 2014.

*Primary Examiner* — Jason Thompson
(74) *Attorney, Agent, or Firm* — Mori & Ward, LLP

(57) ABSTRACT

A leeward tube row of an evaporator includes first to third tube groups, and a windward tube row thereof includes fourth and fifth tube groups. Within a third section of a leeward upper header portion with which heat exchange tubes of the third tube group communicate, a resistance member for flow division is provided so as to divide the interior of the third section into a first space which the heat exchange tubes face, and a second space which is separated from the first space and into which refrigerant flows. The resistance member for flow division has a plurality of refrigerant passage holes. The leeward upper header portion has a flow cutoff member for preventing flow of refrigerant into the first space of the third section. The third section of the leeward upper header portion communicates with the fourth section of the windward upper header portion via refrigerant communication passages.

5 Claims, 14 Drawing Sheets

(51) Int. Cl.
  *F25B 39/02* (2006.01)
  *B60H 1/00* (2006.01)
  *F28D 1/053* (2006.01)
  *F28D 21/00* (2006.01)

(52) U.S. Cl.
  CPC ............ *F28F 9/0204* (2013.01); *F28F 9/026* (2013.01); *F28D 2021/0085* (2013.01); *F28F 9/0273* (2013.01); *F28F 9/0278* (2013.01)

(58) Field of Classification Search
  CPC ...... F28F 9/0265; F28F 9/0268; F28F 9/0278; F28F 9/028; F28F 9/026
  USPC .................................................. 165/174, 176
  See application file for complete search history.

(56) References Cited

U.S. PATENT DOCUMENTS

2010/0115987 A1   5/2010   Kamimura
2013/0126140 A1*  5/2013   Park ..................... F28F 9/0273
                                                       165/173

FOREIGN PATENT DOCUMENTS

JP   2009-156532 A   7/2009
JP   2010-038447     2/2010

* cited by examiner

EVAPORATOR

BACKGROUND OF THE INVENTION

The present invention relates to an evaporator suitable for use in a car air conditioner, which is a refrigeration cycle to be mounted on an automobile, for example.

In this specification and appended claims, the upper and lower sides of FIGS. 2, 3, 10, 11, 16, and 17 will be referred to as "upper" and "lower," respectively.

An evaporator of such a type has been proposed (see Japanese Patent Application Laid-Open (kokai) No. 2009-156532). The proposed evaporator comprises two tube rows juxtaposed in an air-passage direction, each tube row including a plurality of heat exchange tubes which extend vertically and are spaced from one another in a direction perpendicular to the air-passage direction; leeward upper and lower header portions provided on upper and lower sides of the leeward tube row; and windward upper and lower header portions provided on upper and lower sides of the windward tube row. The leeward tube row includes three or more tube groups each composed of a plurality of heat exchange tubes. The windward tube row includes a plurality of tube groups each of which is composed of a plurality of heat exchange tubes and the number of which is one less than the number of the tube groups of the leeward tube row. Each of the leeward upper and lower header portions has sections which are equal in number to the tube groups of the leeward tube row, and the heat exchange tubes of each tube group of the leeward tube row communicate with the corresponding section. Each of the windward upper and lower header portions has sections which are equal in number to the tube groups of the windward tube row, and the heat exchange tubes of each tube group of the windward tube row communicate with the corresponding section. A refrigerant inlet is provided at a section of the leeward upper or lower header portion which section is located at one end thereof. A refrigerant outlet is provided at a section of the windward upper or lower header portion which section is located at an end thereof corresponding to the end where the refrigerant inlet is provided, the windward header portion being located on the same side as the leeward header portion on which the refrigerant inlet is provided. The flow direction of refrigerant within the heat exchange tubes of a farthest tube group of the leeward tube row which is farthest from the refrigerant inlet is the same as the flow direction of refrigerant within the heat exchange tubes of a farthest tube group of the windward tube row which is farthest from the refrigerant outlet. A single path is formed by the above-described two farthest tube groups, which are juxtaposed in the air-passage direction and which are the same in terms of the flow direction of refrigerant within the heat exchange tubes.

The structure of the evaporator disclosed in the publication can restrain an increase in passageway resistance at a final path, which includes a super heat region.

Although the evaporator disclosed in the publication can restrain an increase in passageway resistance at the final path, it has the following problem. Since the total channel sectional area of refrigerant channels of the heat exchange tubes which form the first and second paths decreases, the passageway resistance increases, to thereby cancel out the action of restraining an increase in passageway resistance.

Moreover, in an evaporator of a type as disclosed in the publication, in order to enhance cooling performance, it is demanded to equalize the amounts of refrigerant flowing in the heat exchange tubes of the two tube groups—which are located farthest from the refrigerant inlet and the refrigerant outlet, which are juxtaposed in the air-passage direction and form a single path, and which are the same in terms of the flow direction of refrigerant within the heat exchange tubes.

In order to meet such demand, in one evaporator disclosed in the publication, the leeward farthest section and the windward farthest section are connected together by means of communication means projecting from a heat exchange core portion in the lateral direction. However, in this case, since the communication means projects from the heat exchange core portion in the lateral direction, a dead space is produced when the evaporator is installed.

Another evaporator disclosed in the publication has a following structure. A partition wall is provided between the leeward farthest section and the windward farthest section, and communication holes are formed in the partition wall so as to establish communication between the two farthest sections. The communication holes are formed on the outer side, with respect to the vertical direction, of the end portions of the heat exchange tubes on the side toward the two farthest sections. However, in the case where the two farthest sections are located on the upper side of the heat exchange tubes, the communication holes are located above the upper ends of the heat exchange tubes. Therefore, the refrigerant having flowed into the leeward farthest section flows in a large amount into the heat exchange tubes of the farthest tube group of the leeward tube row due to influence of the gravity. Accordingly, the conventional evaporator is insufficient in terms of the effect of equalizing the amounts of refrigerant flowing in the heat exchange tubes of the two tube groups, which are juxtaposed in the air-passage direction and form a single path, and which are the same in terms of the flow direction of refrigerant within the heat exchange tubes. Meanwhile, in the case where the two farthest sections are located on the lower side of the heat exchange tubes, the communication holes are located below the lower ends of the heat exchange tubes. Therefore, when the flow rate of refrigerant changes, the refrigerant having flowed into the leeward farthest section flows in a large amount into the heat exchange tubes of the farthest tube group of the leeward tube row. Accordingly, the conventional evaporator is insufficient in terms of the effect of equalizing the amounts of refrigerant flowing in the heat exchange tubes of the two tube groups, which are juxtaposed in the air-passage direction and form a single path, and which are the same in terms of the flow direction of refrigerant within the heat exchange tubes.

SUMMARY OF THE INVENTION

An object of the present invention is to solve the above problem and to provide an evaporator which can enhance cooling performance by equalizing the amounts of refrigerant flowing in heat exchange tubes of two tube groups, which are located farthest from a refrigerant inlet and a refrigerant outlet, which are juxtaposed in an air-passage direction and form a single path, and which are the same in terms of the flow direction of refrigerant within the heat exchange tubes.

To fulfill the above object, the present invention comprises the following modes.

1) An evaporator comprising two tube rows juxtaposed in an air-passage direction, each tube row including a plurality of heat exchange tubes which extend vertically and are spaced from one another in a direction perpendicular to the air-passage direction; leeward upper and lower header portions provided on upper and lower sides of the leeward tube row; and windward upper and lower header portions provided on upper and lower sides of the windward tube row, wherein each tube row includes a plurality of tube groups each composed of a plurality of heat exchange tubes; each of the leeward upper and lower header portions has sections which are equal in number to the tube groups of the leeward tube row, and the heat exchange tubes of each tube group of the leeward tube row communicate with the corresponding section; each of the windward upper and lower header portions has sections which are equal in number to the tube groups of the windward tube row, and the heat exchange tubes of each tube group of the windward tube row communicate with the corresponding section; a refrigerant inlet is provided at a section of the leeward upper or lower header portion which section is located at one end thereof; a refrigerant outlet is provided at a section of the windward upper or lower header portion which section is located at an end thereof corresponding to the end where the refrigerant inlet is provided, the windward upper or lower header portion being located on the same side as the leeward header portion on which the refrigerant inlet is provided; flow directions of refrigerant within the heat exchange tubes of adjacent tube groups of each of the leeward tube row and the windward tube row are opposite each other; a flow direction of refrigerant within the heat exchange tubes of a farthest tube group of the leeward tube row which is farthest from the refrigerant inlet is the same as a flow direction of refrigerant within the heat exchange tubes of a farthest tube group of the windward tube row which is farthest from the refrigerant outlet; the two farthest tube groups, which are juxtaposed in the air-passage direction and which are the same in terms of the flow direction of refrigerant within the heat exchange tubes, form one path; each of the remaining tube groups of the leeward tube row and the windward tube row forms one path; and refrigerant having flowed into the leeward header portion from the refrigerant inlet flows through all the paths successively and flows out through the refrigerant outlet of the windward header portion, wherein each of the total channel sectional area of refrigerant channels of the heat exchange tubes which form the path composed of the two farthest tube groups and the total channel sectional area of refrigerant channels of the heat exchange tubes which form a path located immediately upstream of that path is equal to or greater than the total channel sectional area of refrigerant channels of the heat exchange tubes which form a path located immediately upstream of the corresponding path; and the total channel sectional area of refrigerant channels of the heat exchange tubes which form a path located immediately downstream of the path composed of the two farthest tube groups is greater than the total channel sectional area of refrigerant channels of the heat exchange tubes which form the path composed of the two farthest tube groups.

2) An evaporator according to par. 1), wherein the total channel sectional area of refrigerant channels of the heat exchange tubes which form a path located immediately downstream of the path composed of the two farthest tube groups is at least 60% of the total channel sectional area of refrigerant channels of the heat exchange tubes of the windward farthest tube group.

3) An evaporator according to par. 1), wherein the total channel sectional area of refrigerant channels of the heat exchange tubes of the leeward farthest tube group is equal to the total channel sectional area of refrigerant channels of the heat exchange tubes of the windward farthest tube group; and each of the total channel sectional area of refrigerant channels of the heat exchange tubes of the leeward farthest tube group and the total channel sectional area of refrigerant channels of the heat exchange tubes of the windward farthest tube group is less than the total channel sectional area of refrigerant channels of the heat exchange tubes which form a path located immediately upstream of the path composed of the two farthest tube groups.

4) An evaporator according to par. 1), wherein each of the total channel sectional area of refrigerant channels of the heat exchange tubes which form the path composed of the two farthest tube groups and the total channel sectional area of refrigerant channels of the heat exchange tubes which form a path located immediately upstream of that path is greater than the total channel sectional area of refrigerant channels of the heat exchange tubes which form a path located immediately upstream of the corresponding path.

5) An evaporator according to par. 1), wherein all the heat exchange tubes have the same structure, and are identical with one another in terms of the number of the refrigerant channels and the total channel cross sectional area of the plurality of refrigerant channels; and, through adjustment of the number of the heat exchange tubes which form each path, the total channel sectional area of the refrigerant channels of all the heat exchange tubes which form the path is determined; and the number of the heat exchange tubes of the leeward farthest tube group is equal to the number of the heat exchange tubes of the windward farthest tube group.

6) An evaporator according to par. 1), wherein, of sections of the windward upper or lower header portion which communicate with the heat exchange tubes of the final path, a section at which the refrigerant outlet is not formed has a flow division member provided therein so as to divide the interior of that section into a first space which the heat exchange tubes face and a second space separated from the first space; and refrigerant passage holes are formed in the flow division member.

7) An evaporator according to par. 6), wherein the windward header portion having the section in which the flow division member is provided includes a flow promoting member which promotes the flow of refrigerant into the second space from a section adjacent to that section.

8) An evaporator according to par. 1), wherein the refrigerant inlet is provided on the leeward upper header portion; and the refrigerant outlet is provided on the windward upper header portion.

9) An evaporator according to par. 1), wherein the leeward tube row includes first to third tube groups arranged from the end where the refrigerant inlet is provided toward the opposite end, and the windward tube row includes fourth and fifth tube groups arranged from the end opposite the refrigerant outlet toward the end where the refrigerant outlet is provided;

each of the leeward upper and lower header portions has first through third sections with which the heat exchange tubes of the first through third tube groups communicate, each of the windward upper and lower header portions has fourth and fifth sections with which the heat exchange tubes of the fourth and fifth tube groups communicate, the refrigerant inlet is provided at the first section of the leeward upper or lower header portion, and the refrigerant outlet is provided at the fifth section of the windward upper or lower header portion located on the side where the refrigerant inlet is provided; and the first tube group forms a first path along which refrigerant flows through the heat exchange tubes from the upper or lower side where the refrigerant inlet is located toward the opposite side, the second tube group forms a second path along which refrigerant flows through the heat exchange tubes in a direction opposite the flow direction of refrigerant along the first path, the third and fourth tube groups form a third path along which refrigerant flows through the heat exchange tubes in the same direction as the flow direction of refrigerant along the first path, the fifth tube group forms a fourth path along which refrigerant flows through the heat exchange tubes in a direction opposite the flow direction of refrigerant along the first path, and the third path is formed by the third and fourth tube groups, which are juxtaposed in the air-passage direction and are the same in terms of the flow direction of refrigerant within the heat exchange tubes.

10) An evaporator comprising two tube rows juxtaposed in an air-passage direction, each tube row including a plurality of heat exchange tubes which extend vertically and are spaced from one another in a direction perpendicular to the air-passage direction; leeward upper and lower header portions provided on upper and lower sides of the leeward tube row; and windward upper and lower header portions provided on upper and lower sides of the windward tube row, wherein each tube row includes a plurality of tube groups each composed of a plurality of heat exchange tubes; each of the leeward upper and lower header portions has sections which are equal in number to the tube groups of the leeward tube row, and the heat exchange tubes of each tube group of the leeward tube row communicate with the corresponding section; each of the windward upper and lower header portions has sections which are equal in number to the tube groups of the windward tube row, and the heat exchange tubes of each tube group of the windward tube row communicate with the corresponding section; a refrigerant inlet is provided at a section of the leeward upper or lower header portion which section is located at one end thereof; a refrigerant outlet is provided at a section of the windward upper or lower header portion which section is located at an end thereof corresponding to the end where the refrigerant inlet is provided, the windward upper or lower header portion being located on the same side as the leeward header portion on which the refrigerant inlet is provided; flow directions of refrigerant within the heat exchange tubes of adjacent tube groups of each of the leeward tube row and the windward tube row are opposite each other; a flow direction of refrigerant within the heat exchange tubes of a farthest tube group of the leeward tube row which is farthest from the refrigerant inlet is the same as a flow direction of refrigerant within the heat exchange tubes of a farthest tube group of the windward tube row which is farthest from the refrigerant outlet; and the two farthest tube groups, which are juxtaposed in the air-passage direction and which are the same in terms of the flow direction of refrigerant within the heat exchange tubes, form one path, wherein, within a leeward farthest section which is located on the upstream side with respect to a refrigerant flow direction and with which the heat exchange tubes of the farthest tube group of the leeward tube row communicate, a resistance member for flow division is provided so as to divide the interior of the leeward farthest section into a first space which the heat exchange tubes face, and a second space which is separated from the first space and into which refrigerant flows from a section adjacent to the leeward farthest section with respect to a direction toward the refrigerant inlet; refrigerant passage holes are formed in the resistance member for flow division, and refrigerant communication passages establish communication between the second space of the leeward farthest section and the windward farthest section which is located on the upstream side with respect to the refrigerant flow direction and with which the heat exchange tubes of the farthest tube group of the windward tube row communicate.

11) An evaporator according to par. 10), wherein the header portion having the leeward farthest section includes a flow cutoff member which prevents flow of refrigerant into the first space of the leeward farthest section.

12) An evaporator according to par. 10), wherein a relation B>A is satisfied, where A represents the total sectional area of the refrigerant passage holes, and B represents the total sectional area of the refrigerant communication passages.

13) An evaporator according to par. 10), further comprising a promoting member which promotes inflow of refrigerant from the second space of the leeward farthest section into the windward farthest section.

14) An evaporator according to par. 13), wherein the promoting member is provided in the header portion having the leeward farthest section.

15) An evaporator according to par. 14), wherein the promoting member is composed of an obstruction plate which is provided on the leeward side of an inlet of the leeward farthest section through which refrigerant flows into the second space, and hinders flow of refrigerant toward the leeward side of the second space.

16) An evaporator according to par. 14), wherein the promoting member is composed of an obstruction plate which is provided at an intermediate portion of the second space of the leeward farthest section with respect to the arrangement direction of the heat exchange tubes to be located on the side toward the heat exchange tubes, and hinders flow of refrigerant toward a region within the second space, the region being located on the side toward the heat exchange tubes.

17) An evaporator according to par. 10), wherein the leeward tube row includes first to third tube groups arranged from the end where the refrigerant inlet is provided toward the opposite end; the windward tube row includes fourth and fifth tube groups arranged from the end opposite the refrigerant outlet toward the end where the refrigerant outlet is provided; and each of the leeward upper and lower header portions has first through third sections with which the heat exchange tubes of the first through third tube groups communicate, each of the windward upper and lower header portions has fourth and fifth sections with which the heat exchange tubes of the fourth and fifth tube groups communicate, the refrigerant inlet is provided at the first section of the leeward upper or lower header portion, and the refrigerant outlet is provided at the fifth section of the windward upper or lower header portion located on the side where the refrigerant inlet is provided;

the first tube group forms a first path along which refrigerant flows through the heat exchange tubes from the upper or lower side where the refrigerant inlet is located toward the opposite side, the second tube group forms a second path along which refrigerant flows through the heat exchange tubes in a direction opposite the flow direction of refrigerant along the first path, the third and fourth tube groups form a third path along which refrigerant flows through the heat exchange tubes in the same direction as the flow direction of refrigerant along the first path, the fifth tube group forms a fourth path along which refrigerant flows through the heat exchange tubes in a direction opposite the flow direction of refrigerant along the first path, and the third path is formed by the third and fourth tube groups, which are juxtaposed in the air-passage direction and are the same in terms of the flow direction of refrigerant within the heat exchange tubes; and the third tube group of the leeward tube row is the farthest tube group, the third section of the leeward upper or lower header portion located on the side where the refrigerant inlet is provided is the farthest section which is located on the upstream side with respect to the refrigerant flow direction and with which the heat exchange tubes of the third tube group communicate, the resistance member for flow division is provided in the third section so as to divide the interior of the third section into a first space and a second space, and refrigerant flows into the second space of the third section from the second section of the header portion located on the side where the refrigerant inlet is provided.

18) An evaporator according to par. 10), wherein the leeward tube row includes first to fourth tube groups arranged from the end where the refrigerant inlet is provided toward the opposite end; the windward tube row includes fifth to seventh tube groups arranged from the end opposite the refrigerant outlet toward the end where the refrigerant outlet is provided; and each of the leeward upper and lower header portions has first through fourth sections with which the heat exchange tubes of the first through fourth tube groups communicate, each of the windward upper and lower header portions has fifth to seventh sections with which the heat exchange tubes of the fifth to seventh tube groups communicate, the refrigerant inlet is provided at the first section of the leeward upper or lower header portion, and the refrigerant outlet is provided at the seventh section of the windward upper or lower header portion located on the side where the refrigerant inlet is provided;

the first tube group forms a first path along which refrigerant flows through the heat exchange tubes from the upper or lower side where the refrigerant inlet is located toward the opposite side, the second tube group forms a second path along which refrigerant flows through the heat exchange tubes in a direction opposite the flow direction of refrigerant along the first path, the third tube group forms a third path along which refrigerant flows through the heat exchange tubes in the same direction as the flow direction of refrigerant along the first path, the fourth and fifth tube groups form a fourth path along which refrigerant flows through the heat exchange tubes in the direction opposite the flow direction of refrigerant along the first path, the sixth tube group forms a fifth path along which refrigerant flows through the heat exchange tubes in the same direction as the flow direction of refrigerant along the first path, the seventh tube group forms a sixth path along which refrigerant flows through the heat exchange tubes in a direction opposite the flow direction of refrigerant along the first path, and the fourth path is formed by the fourth and fifth tube groups, which are juxtaposed in the air-passage direction and are the same in terms of the flow direction of refrigerant within the heat exchange tubes; and the fourth tube group of the leeward tube row is the farthest tube group, the fourth section of the leeward upper or lower header portion located on the side opposite the side where the refrigerant inlet is provided is the farthest section which is located on the upstream side with respect to the refrigerant flow direction and with which the heat exchange tubes of the fourth tube group communicate, the resistance member for flow division is provided in the fourth section so as to divide the interior of the fourth section into a first space and a second space, and refrigerant flows into the second space of the fourth section from the third section of the header portion located on the side opposite the side where the refrigerant inlet is provided.

19) An evaporator according to par. 10), wherein the refrigerant inlet is provided on the leeward upper header portion; and the refrigerant outlet is provided on the windward upper header portion.

20) An evaporator according to par. 10), wherein each of the total channel sectional area of refrigerant channels of the heat exchange tubes which form the path composed of the two farthest tube groups and the total channel sectional area of refrigerant channels of the heat exchange tubes which form a path located immediately upstream of that path is equal to or greater than the total channel sectional area of refrigerant channels of the heat exchange tubes which form a path located immediately upstream of the corresponding path; and the total channel sectional area of refrigerant channels of the heat exchange tubes which form a path located immediately downstream of the path composed of the two farthest tube groups is greater than the total channel sectional area of refrigerant channels of the heat exchange tubes which form the path composed of the two farthest tube groups.

21) An evaporator according to par. 20), wherein the total channel sectional area of refrigerant channels of the heat exchange tubes which form a path located immediately downstream of the path composed of the two farthest tube groups is at least 60% of the total channel sectional area of refrigerant channels of the heat exchange tubes of the windward farthest tube group.

22) An evaporator according to par. 20), wherein the total channel sectional area of refrigerant channels of the heat exchange tubes of the leeward farthest tube group is equal to the total channel sectional area of refrigerant channels of the heat exchange tubes of the windward farthest tube group; and each of the total channel sectional area of refrigerant channels of the heat exchange tubes of the leeward farthest tube group and the total channel sectional area of refrigerant channels of the heat exchange tubes of the windward farthest tube group is less than the total channel sectional area of refrigerant channels of the heat exchange tubes which form a path located immediately upstream of the path composed of the two farthest tube groups.

23) An evaporator according to par. 20), wherein each of the total channel sectional area of refrigerant channels of the heat exchange tubes which form the path composed of the two farthest tube groups and the total channel sectional area of refrigerant channels of the heat exchange tubes which form a path located immediately upstream of that path is greater than the total channel sectional area of refrigerant channels of the heat exchange tubes which form a path located immediately upstream of the corresponding path.

24) An evaporator according to par. 20), wherein all the heat exchange tubes have the same structure, and are identical with one another in terms of the number of the refrigerant channels and the total channel cross sectional area of the plurality of refrigerant channels; and, through adjustment of the number of the heat exchange tubes which form each path, the total channel sectional area of the refrigerant channels of the heat exchange tubes which form the path is determined; and the number of the heat exchange tubes of the leeward farthest tube group is equal to the number of the heat exchange tubes of the windward farthest tube group.

According to the evaporator of pars. 1) to 9), each of the total channel sectional area of refrigerant channels of the heat exchange tubes which form the path composed of the two farthest tube groups and the total channel sectional area of refrigerant channels of the heat exchange tubes which form a path located immediately upstream of that path is equal to or greater than the total channel sectional area of refrigerant channels of the heat exchange tubes which form a path located immediately upstream of the corresponding path; and the total channel sectional area of refrigerant channels of the heat exchange tubes which form a path located immediately downstream of the path composed of the two farthest tube groups is greater than the total channel sectional area of refrigerant channels of the heat exchange tubes which form the path composed of the two farthest tube groups. Therefore, even when vapor-liquid mixed phase refrigerant having flowed into the evaporator flows through all the paths successively, whereby evaporation of the liquid phase component of the refrigerant proceeds and the specific volume increases, an increase in passageway resistance at paths, excluding the first path, can be restrained. In addition, when vapor-liquid mixed phase refrigerant having flowed into the evaporator flows through all the paths successively, an increase in passageway resistance of the final path, which includes a super heat region and through which a large amount of vapor-phase refrigerant flows, can be restrained, whereby the performance of the evaporator can be enhanced.

According to the evaporator of par. 3), the total channel sectional area of refrigerant channels of the heat exchange tubes of the leeward farthest tube group is equal to the total channel sectional area of refrigerant channels of the heat exchange tubes of the windward farthest tube group; and each of the total channel sectional area of refrigerant channels of the heat exchange tubes of the leeward farthest tube group and the total channel sectional area of refrigerant channels of the heat exchange tubes of the windward farthest tube group is less than the total channel sectional area of refrigerant channels of the heat exchange tubes which form a path located immediately upstream of the path composed of the two farthest tube groups. Therefore, it is possible to equalize divided flows into the heat exchange tubes of the path composed of the two farthest tube group, while securing the total channel sectional area of refrigerant channels of the heat exchange tubes which form a path located immediately upstream of the path composed of the two farthest tube groups.

According to the evaporator of par. 4), each of the total channel sectional area of refrigerant channels of the heat exchange tubes which form the path composed of the two farthest tube groups and the total channel sectional area of refrigerant channels of the heat exchange tubes which form a path located immediately upstream of that path is greater than the total channel sectional area of refrigerant channels of the heat exchange tubes which form a path located immediately upstream of the corresponding path. Therefore, even when vapor-liquid mixed phase refrigerant having flowed into the evaporator flows through all the paths successively, whereby evaporation of the liquid phase component of the refrigerant proceeds and the specific volume increases, an increase in passageway resistance at paths, excluding the farthest upstream path, can be restrained effectively.

According to the evaporator of par. 5), each of the total channel sectional area of refrigerant channels of the heat exchange tubes which form the path composed of the two farthest tube groups and the total channel sectional area of refrigerant channels of the heat exchange tubes which form a path located immediately upstream of that path can be relatively easily made equal to or greater than the total channel sectional area of refrigerant channels of the heat exchange tubes which form a path located immediately upstream of the corresponding path, and the total channel sectional area of refrigerant channels of the heat exchange tubes which form the final path can be relatively easily made equal to or greater than 60% of the total channel sectional area of refrigerant channels of the heat exchange tubes of the windward farthest tube group. In addition, the number of types of parts can be reduced.

According to the evaporator of par. 6), divided flows of refrigerant into the refrigerant channels of the heat exchange tubes of the tube group which forms the final path can be equalized.

According to the evaporator of par. 7), the flow promoting member promotes the flow of refrigerant into the above-mentioned second space from the section adjacent to the section in which the flow division member is provided. Therefore, refrigerant having entered the second space enters the first space via the refrigerant passage holes of the flow division member, and then flows into the heat exchange tubes. Accordingly, the divided flows into the refrigerant channels of the heat exchange tubes of the tube group which forms the final path can be equalized more effectively.

According to the evaporator of pars. 10) to 19), within a leeward farthest section which is located on the upstream side with respect to a refrigerant flow direction and with which the heat exchange tubes of the farthest tube group of the leeward tube row communicate, a resistance member for flow division is provided so as to divide the interior of the leeward farthest section into a first space which the heat exchange tubes face, and a second space which is separated from the first space and into which refrigerant flows from a section adjacent to the leeward farthest section with respect to a direction toward the refrigerant inlet; refrigerant passage holes are formed in the resistance member for flow division, and refrigerant communication passages establish communication between the second space of the leeward farthest section and the windward farthest section which is located on the upstream side with respect to the refrigerant flow direction and with which the heat exchange tubes of the farthest tube group of the windward tube row communicate. Therefore, no dead space is produced when the evaporator is installed.

Furthermore, after having flowed into the second space of the leeward farthest section, refrigerant flows into the windward farthest section via the refrigerant communication passages, and flows into the heat exchange tubes of the farthest tube group of the windward tube row. Simultaneously, refrigerant enters the first space via the refrigerant passage holes of the resistance member for flow division, and then flows into the heat exchange tubes of the farthest tube group of the leeward tube row. The refrigerant having flowed into the second space of the leeward farthest section receives a resistance which is produced by the resistance member for flow division against flow into the first space. Therefore, in the case where the leeward farthest section and the windward farthest section are located on the upper side of the heat exchange tubes, refrigerant having flowed into the leeward farthest section is restrained from flowing in a large amount into the heat exchange tubes of the farthest tube group of the leeward tube row due to the influence of the gravity. Accordingly, it becomes possible to equalize the amount of refrigerant flowing into the heat exchange tubes of the farthest tube group of the leeward tube row and the amount of refrigerant flowing into the heat exchange tubes of the farthest tube group of the windward tube row. Meanwhile, in the case where the leeward farthest section and the windward farthest section are located on the lower side of the heat exchange tubes, even when the flow rate of refrigerant changes, refrigerant having flowed into the leeward farthest section is restrained from flowing in a large amount into the heat exchange tubes of the farthest tube group of the leeward tube row. Accordingly, it becomes possible to equalize the amount of refrigerant flowing into the heat exchange tubes of the farthest tube group of the leeward tube row and the amount of refrigerant flowing into the heat exchange tubes of the farthest tube group of the windward tube row. As a result, it becomes possible to equalize the amounts of refrigerant flowing through the heat exchange tubes of the two farthest tube groups, which are located farthest from the refrigerant inlet and the refrigerant outlet, are juxtaposed in the air-passage direction so as to form a single path, and are the same in terms of the flow direction of refrigerant within the heat exchange tubes.

According to the evaporator of par. 12), it becomes possible to effectively equalize the amounts of refrigerant flowing through the heat exchange tubes of the two tube groups, which are located farthest from the refrigerant inlet and the refrigerant outlet, are juxtaposed in the air-passage direction so as to form a single path, and are the same in terms of the flow direction of refrigerant within the heat exchange tubes.

According to the evaporator of pars. 13) to 16), a promoting member which promotes inflow of refrigerant from the second space of the leeward farthest section into the windward farthest section is provided. Therefore, the inflow of refrigerant from the second space of the leeward farthest section into the windward farthest section is promoted, whereby the amount of refrigerant flowing into the second space of the leeward farthest section and the amount of refrigerant flowing into the windward farthest section are equalized. Accordingly, the amount of refrigerant flowing into the heat exchange tubes of the farthest tube group of the leeward tube row connected to the leeward farthest section and the amount of refrigerant flowing into the heat exchange tubes of the farthest tube group of the windward tube row connected to the windward farthest section are equalized effectively. As a result, it becomes possible to effectively equalize the amounts of refrigerant flowing through the heat exchange tubes of the two farthest tube groups, which are located farthest from the refrigerant inlet and the refrigerant outlet, are juxtaposed in the air-passage direction, and are the same in terms of the flow direction of refrigerant within the heat exchange tubes, whereby the cooling performance of the evaporator is further enhanced.

According to the evaporator of pars. 15) and 16), the promoting member which promotes inflow of refrigerant from the leeward farthest section into the windward farthest section can be provided relatively easily.

DESCRIPTION OF THE PREFERRED EMBODIMENTS

Figure 1:
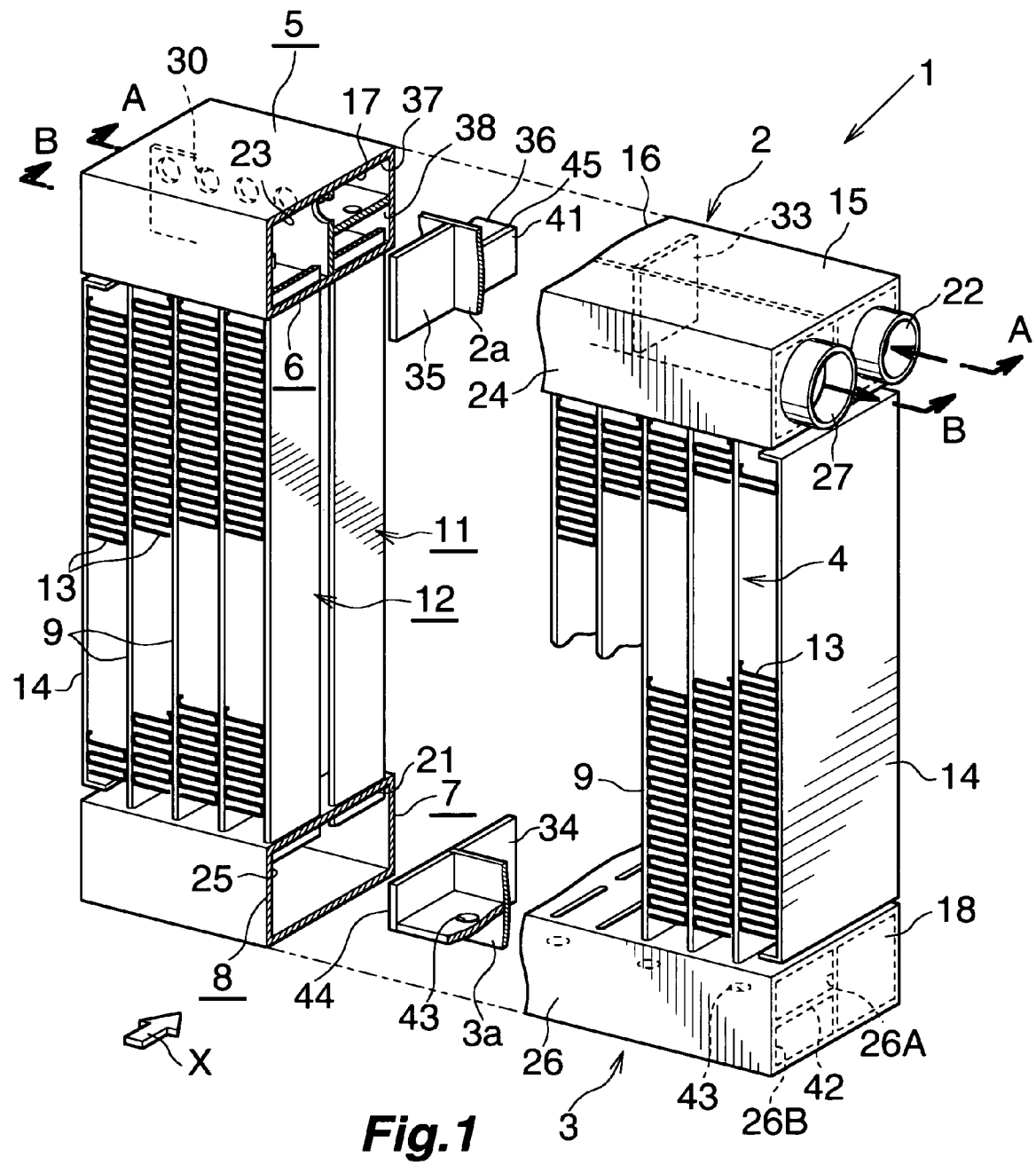
FIG. 1 is a partially cut-away perspective view showing the overall structure of an evaporator according to a first embodiment of the present invention.
Figure 2:
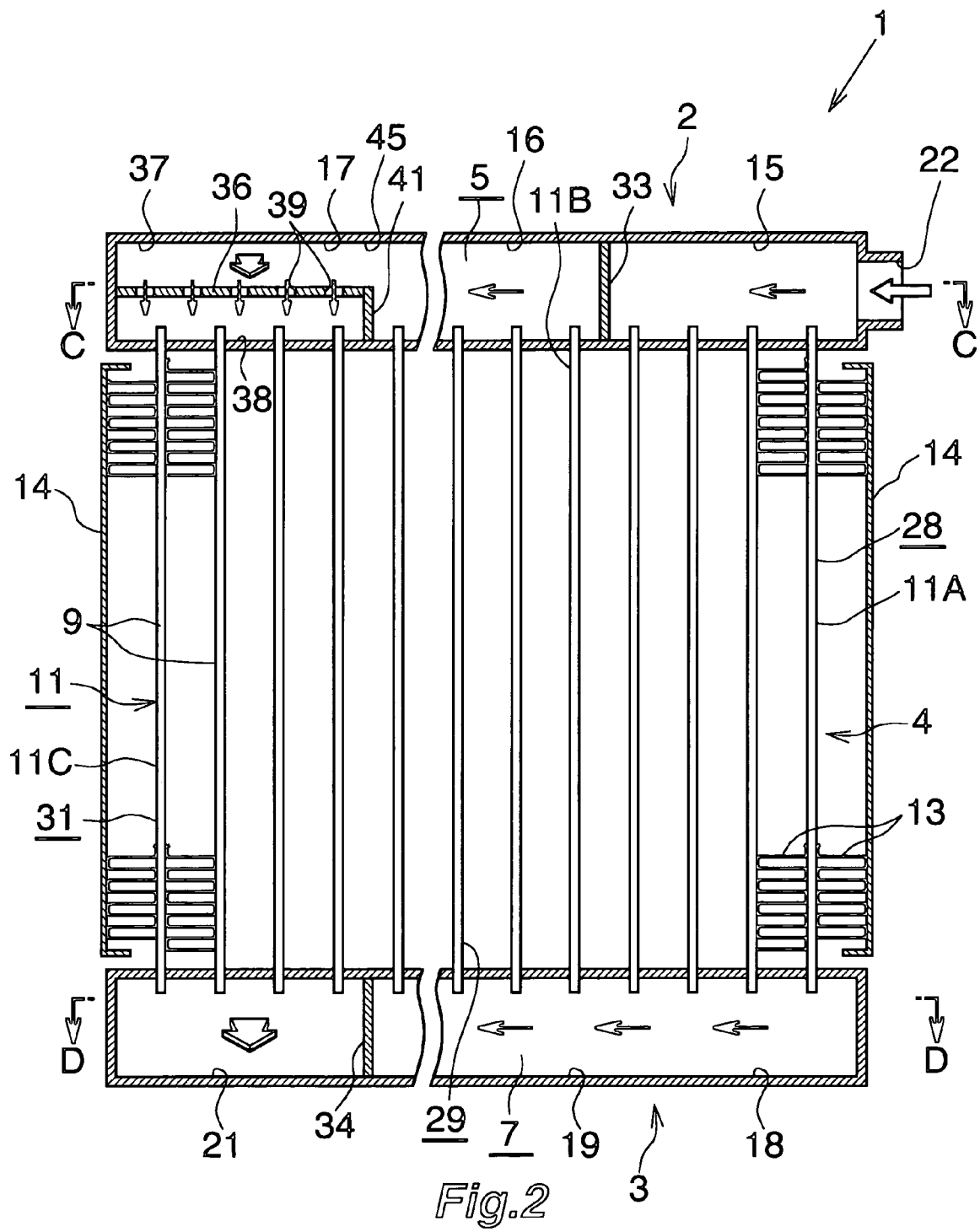
FIG. 2 is a partially omitted sectional view taken along line A-A of FIG. 1.
Figure 3:
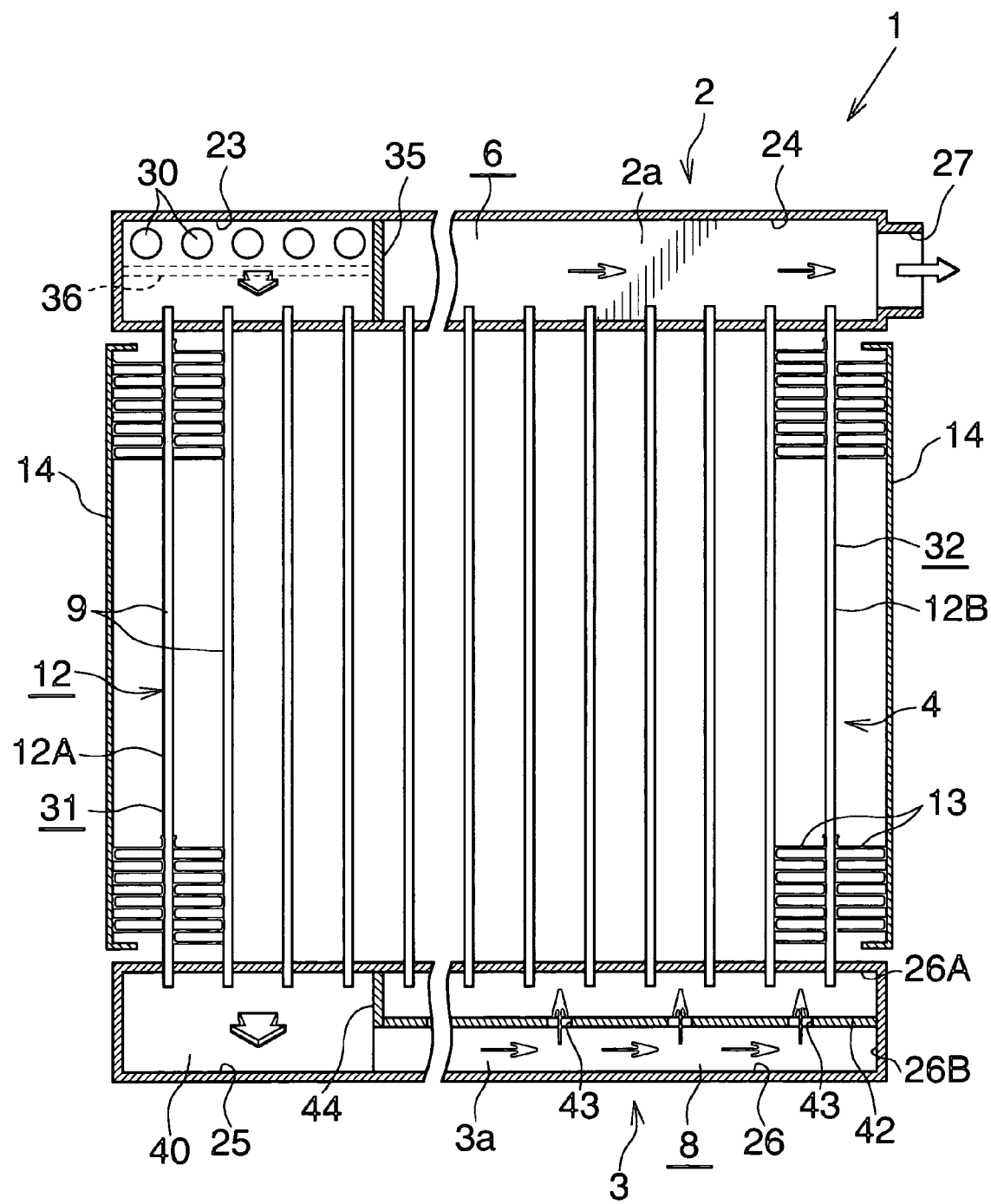
FIG. 3 is a partially omitted sectional view taken along line B-B of FIG. 1.
Figure 4:
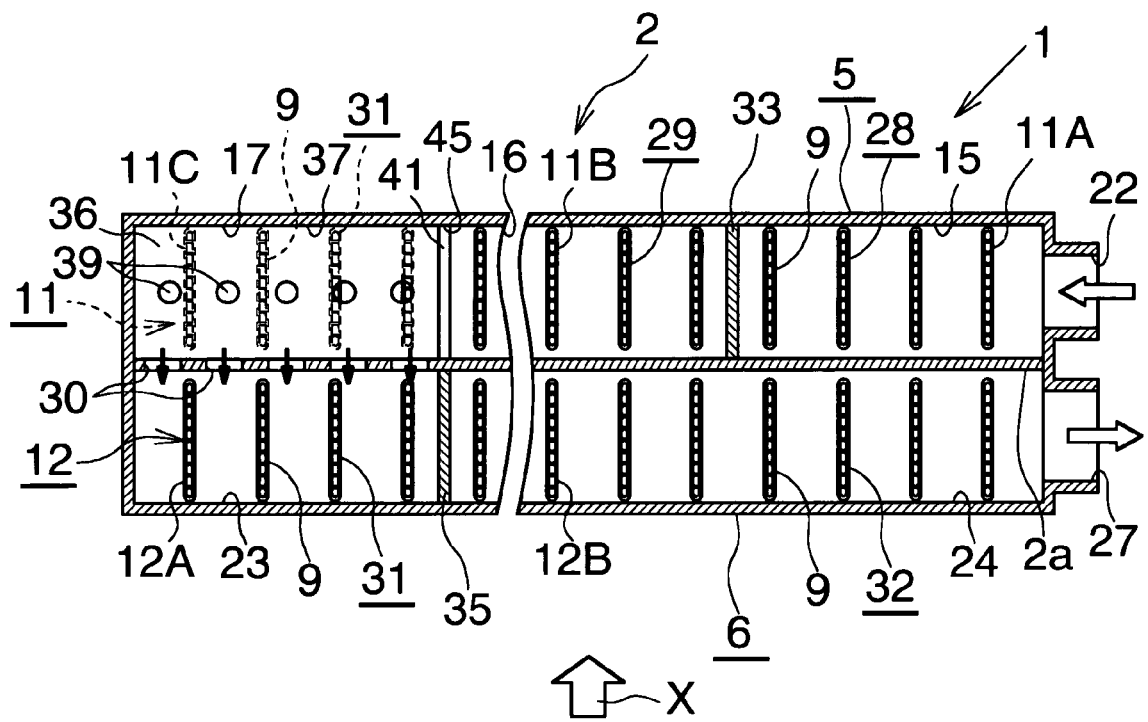
FIG. 4 is a sectional view taken along line C-C of FIG. 2.
Figure 5:
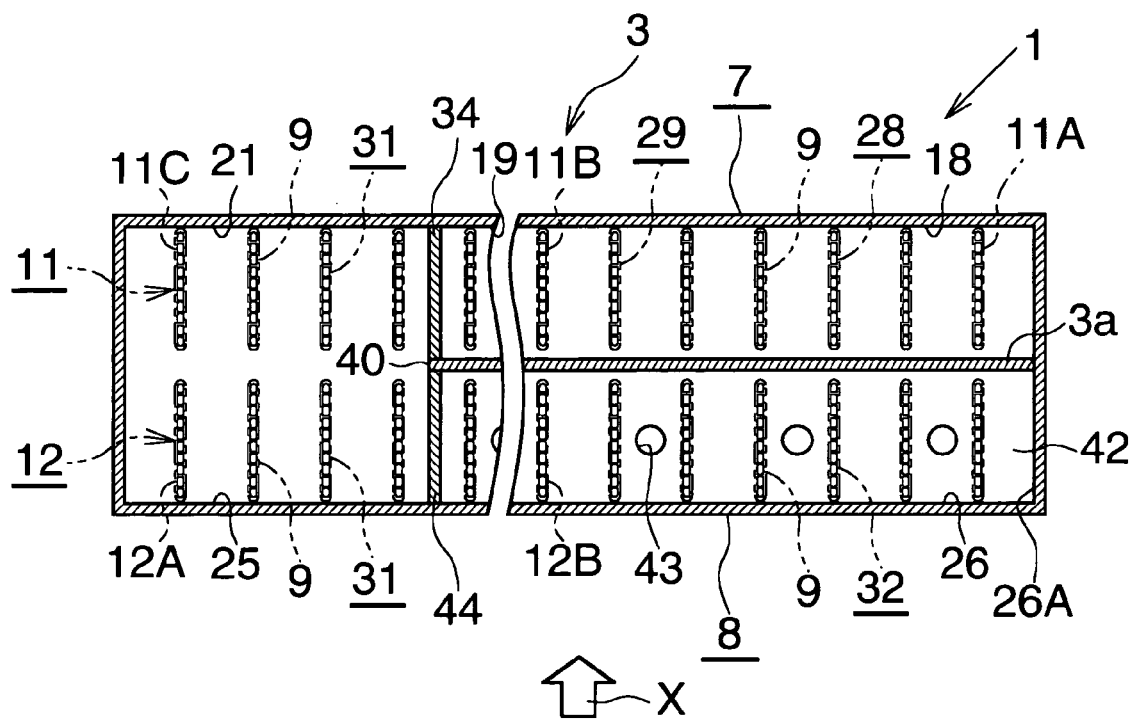
FIG. 5 is a sectional view taken along line D-D of FIG. 2.

Embodiments of the present invention will next be described with reference to the drawings. In the embodiments which will be described below, the evaporator of the present invention is applied to a refrigeration cycle which constitutes a car air conditioner.

Like portions and members are denoted by like reference numerals throughout the drawings, and repeated description is not provided.

In the following description, the term "aluminum" encompasses aluminum alloys in addition to pure aluminum.

In the following description, the downstream side (a direction represented by arrow X in FIGS. 1, 4, 5, 12, 13, and 15) of an air flow through air-passing clearances between adjacent heat exchange tubes will be referred to as the "front," and the opposite side as the "rear." Furthermore, the left-hand and right-hand sides of FIGS. 2 to 5, FIGS. 10 to 13, and FIGS. 16 to 17 will be referred to as "left" and "right," respectively.

First Embodiment

Figure 6:
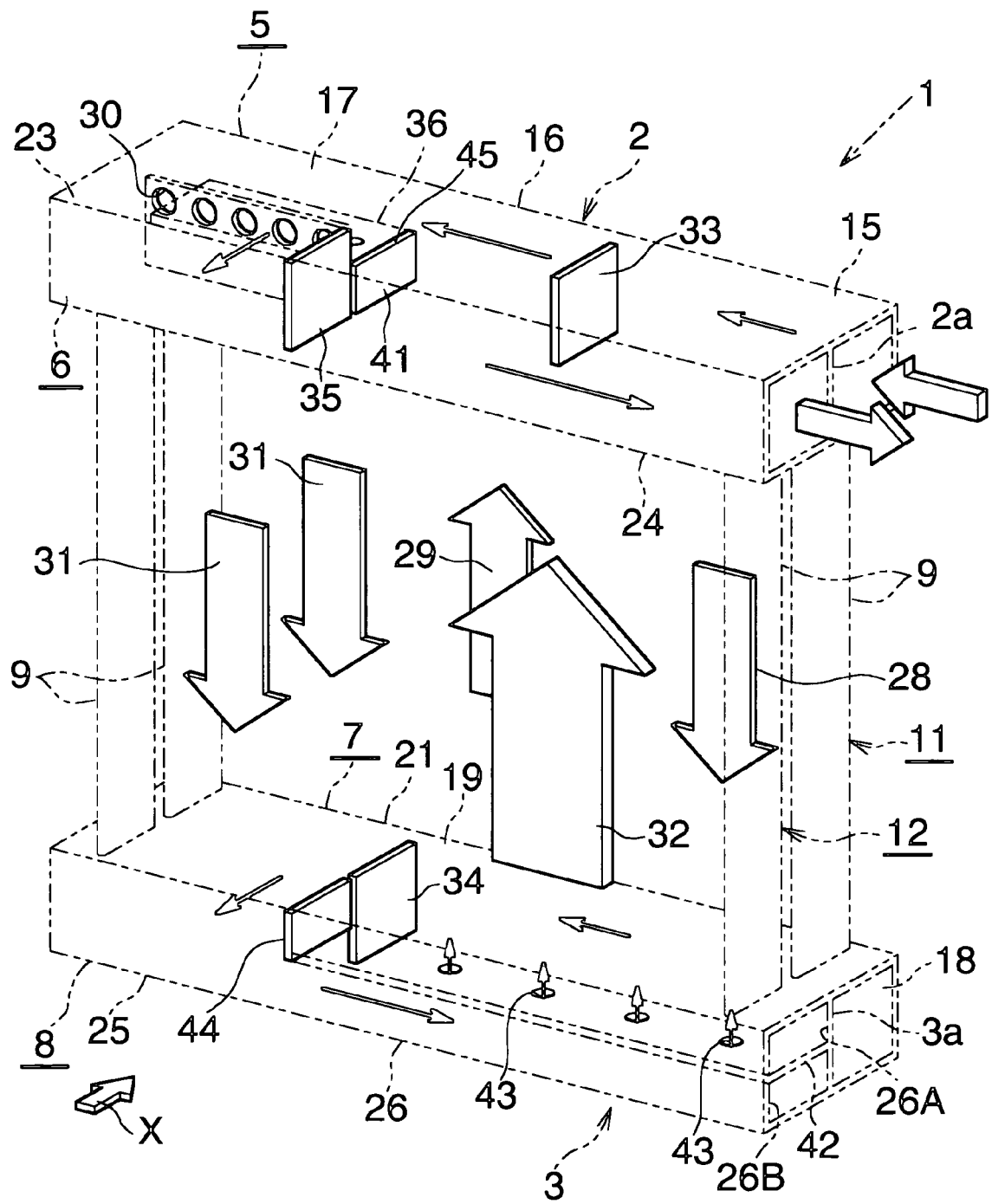
FIG. 6 is a view showing the flow of refrigerant within the evaporator of FIG. 1.

FIGS. 1 to 6 show a first embodiment of the present invention. FIG. 1 shows the overall configuration of an evaporator, and FIGS. 2 to 5 show the configurations of essential portions of the evaporator. FIG. 6 shows the flow of refrigerant within the evaporator of FIG. 1.

As shown in FIG. 1, an evaporator 1 includes a first header tank 2 and a second header tank 3 formed of aluminum and disposed apart from each other in the vertical direction; and a heat exchange core portion 4 provided between the two header tanks 2, 3.

The first header tank 2 includes a leeward header portion 5 located on the leeward side (front side), and a windward header portion 6 located on the windward side (rear side) and united with the leeward header portion 5. In the present embodiment, the leeward header portion 5 and the windward header portion 6 are provided by means of partitioning the first header tank 2 into front and rear portions by a partition portion 2*a*. The second header tank 3 includes a leeward header portion 7 located on the leeward side (front side), and a windward header portion 8 located on the windward side (rear side) and united with the leeward header portion 7. In the present embodiment, the leeward header portion 7 and the windward header portion 8 are provided by means of partitioning the second header tank 3 into front and rear portions by a partition portion 3*a*.

In the following description, the leeward header portion 5 of the first header tank 2 will be referred to as the leeward upper header portion; the leeward header portion 7 of the second header tank 3 will be referred to as the leeward lower header portion; the windward header portion 6 of the first header tank 2 will be referred to as the windward upper header portion; and the windward header portion 8 of the second header tank 3 will be referred to as the windward lower header portion.

The heat exchange core portion 4 is configured as follows. Two tube rows 11, 12 are juxtaposed in the front-rear direction. Each of the tube rows 11, 12 is composed of a plurality of flat heat exchange tubes 9 made of aluminum and extending in the vertical direction. The heat exchange tubes 9 are disposed such that their width direction coincides with the air-passage direction; and they are spaced from one another in the left-right direction (the direction perpendicular to the air-passage direction). Corrugated fins 13 made of aluminum are disposed in air-passing clearances between the adjacent heat exchange tubes 9 of each tube row 11, 12 and externally of the left- and right-end heat exchange tubes 9 such that the corrugated fins 13 extend over the heat exchange tubes 9 of the front and rear tube rows 11, 12, and are brazed to the corresponding heat exchange tubes 9. Side plates 14 made of aluminum are disposed externally of the left- and right-end corrugated fins 13, and are brazed to the corresponding corrugated fins 13. Each of the heat exchange tubes 9 is formed from aluminum extrudate, and has a plurality of refrigerant channels arranged in the width direction thereof. Upper and lower end portions of the heat exchange tubes 9 of the leeward tube row 11 are communicatably connected to the leeward upper and lower header portions 5, 7; and upper and lower end portions of the heat exchange tubes 9 of the windward tube row 12 are communicatably connected to the windward upper and lower header portions 6, 8. Notably, the number of the heat exchange tubes 9 of the leeward tube row 11 is equal to the number of the heat exchange tubes 9 of the windward tube row 12. All the heat exchange tubes 9 have the same structure, and are identical with one another in terms of the number of the refrigerant channels and the total channel cross sectional area of the plurality of refrigerant channels.

As shown in FIGS. 2 to 5, the leeward tube row 11 includes three tube groups 11A, 11B, 11C, each of which is composed of a plurality of heat exchange tubes 9 and which are arranged from the right end toward the left end; and the windward tube row 12 includes two tube groups (the number of which is one less than the number of the tube groups of the leeward tube row 11); i.e., fourth and fifth tube groups 12A, 12B, each of which is composed of a plurality of heat exchange tubes 9 and which are arranged from the left end toward the right end.

The leeward upper and lower header portions 5, 7 have sections 15, 16, 17 and sections 18, 19, 21, respectively, the number of which is equal to the number of the tube groups 11A, 11B, 11C of the leeward tube row 11 and which communicate with the heat exchange tubes 9 of the tube groups 11A, 11B, 11C, respectively. A refrigerant inlet 22 is provided at the right end of the right end section 15 of the leeward upper header portion 5. The three tube groups 11A, 11B, 11C of the leeward tube row 11 will be referred to as the first to third tube groups, from the end where the refrigerant inlet 22 is provided (the right end) toward the opposite end (the left end). The sections 15, 16, 17 and the sections 18, 19, 21, with which the heat exchange tubes 9 of the first to third tube groups 11A, 11B, 11C communicate, will be referred to as the first to third sections, from the end where the refrigerant inlet 22 is provided (the right end) toward the opposite end (the left end). The third tube group 11C is the farthest tube group of the leeward tube row 11 located farthest from the refrigerant inlet 22; and the third section 17 of the leeward upper header portion 5 is the leeward farthest section which is located on the upstream side with respect to the refrigerant flow direction (on the upper side) and with which the heat exchange tubes 9 of the third tube groups 11C communicate.

The windward upper and lower header portions 6, 8 have sections 23, 24 and sections 25, 26, respectively, the number of which is equal to the number of the tube groups 12A, 12B of the windward tube row 12 and which communicate with the heat exchange tubes 9 of the tube groups 12A, 12B, respectively. A refrigerant outlet 27 is provided at the right end of the right end section 24 of the windward upper header portion 6 (at the end where the refrigerant inlet 22 is provided). The two tube groups 12A, 12B of the windward tube row 12 will be referred to as the fourth and fifth tube groups, from the end (the left end) opposite the refrigerant outlet 27 toward the end where the refrigerant outlet 27 is provided (the right end); and the sections 23, 24 and the sections 25, 26, with which the heat exchange tubes 9 of the fourth and fifth tube groups 12A, 12B communicate, will be referred to as the fourth and fifth sections, from the end (the left end) opposite the refrigerant outlet 27 toward the end where the refrigerant outlet 27 is provided (the right end). The fourth tube group 12A is the farthest tube group of the windward tube row 12 located farthest from the refrigerant outlet 27; and the fourth section 23 of the windward upper header portion 6 is the windward farthest section which is located on the upstream side with respect to the refrigerant flow direction (on the upper side) and with which the heat exchange tubes 9 of the fourth tube group 12A communicate.

Notably, the total number of the heat exchange tubes 9 which constitute the first and second tube groups 11A, 11B of the leeward tube row 11 is equal to the number of the heat exchange tubes 9 which constitute the fifth tube group 12B of the windward tube row 12; and the number of the heat exchange tubes 9 which constitute the third tube group 11C of the leeward tube row 11 is equal to the number of the heat exchange tubes 9 which constitute the fourth tube group 12A of the windward tube row 12. Furthermore, the respective total lengths (as measured in the left-right direction) of the first sections 15, 18 and the second sections 16, 19 of the leeward upper and lower header portions 5, 7 are equal to the respective lengths (as measured in the left-right direction) of the fifth sections 24, 26 of the windward upper and lower header portions 6, 8; and the respective lengths (as measured in the left-right direction) of the third sections 17, 21 of the leeward upper and lower header portions 5, 7 are equal to those of the fourth sections 23, 25 of the windward upper and lower header portions 6, 8.

A partition wall 33 is provided between the first section 15 and the second section 16 of the leeward upper header portion 5, whereby communication between the two sections 15, 16 is prohibited. A platelike resistance member for flow division 36 is provided within the third section 17 (the leeward farthest section) of the leeward upper header portion 5 so as to divide the interior of the third section 17 into a lower first space 38 which the heat exchange tubes 9 face, and an upper second space 37 separated from the first space 38. A flow cutoff member 41 is provided between the second section 16 and the third section 17 of the leeward upper header portion 5 so as to close the right end opening of the first space 38 of the third section 17 and prevents the flow of refrigerant from the second section 16 toward the first space 38. The right end of the second space 37 of the third section 17 is fully opened, whereby communication is established between the second section 16 and the second space 37 of the third section 17. Therefore, refrigerant flows into the second space 37 of the third section 17 from the second section 16, which is adjacent to the third section 17 with respect to the direction toward the refrigerant inlet 22. The opening at the right end of the second space 37 of the third section 17 serves as an inlet 45, through which refrigerant flows into the second space 37 of the third section 17. Furthermore, a plurality of refrigerant passage holes 39 are formed in the resistance member for flow division 36 at predetermined intervals in the left-right direction, whereby communication is established between the two spaces 37, 38.

The first section 18 and the second section 19 of the leeward lower header portion 7 communicate with each other. A partition wall 34 is provided between the second section 19 and the third section 21 of the leeward lower header portion 7, whereby communication between the two sections 19, 21 is prohibited.

A partition wall 35 is provided between the fourth section 23 and the fifth section 24 of the windward upper header portion 6, whereby communication between the two sections 23, 24 is prohibited.

A platelike resistance member for flow division 42 is provided within the fifth section 26 of the windward lower header portion 8 so as to divide the interior of the fifth section 26 into an upper space 26A and a lower space 26B. A plurality of refrigerant passage holes 43 are formed in the resistance member for flow division 42 at predetermined intervals in the left-right direction. Furthermore, a platelike flow promoting member 44 is provided between the fourth section 25 and the fifth section 26 of the windward lower header portion 8 so as to close the left end opening of the upper space 26A of the fifth section 26, to thereby promote the flow of refrigerant from the fourth section 25 toward the lower space 26B of the fifth section 26. Furthermore, the left end of the lower space 26B of the fifth section 26 is fully opened, whereby communication is established between the fourth section 25 and the lower space 26B of the fifth section 26. Therefore, refrigerant flows into the lower space 26B of the fifth section 26 from the fourth section 25. Notably, a refrigerant passage hole(s) may be formed in the flow promoting member 44 if the hole does not hinder the promotion of the flow of refrigerant from the fourth section 25 to the lower space 26B of the fifth section 26.

Communication is established between the second space 37 of the third section 17 of the leeward upper header portion 5 and the fourth section 23 of the windward upper header portion 6 through a plurality of communication paths 30 (through holes) provided at predetermined intervals (in the left-right direction) in a portion of the partition portion 2a of the first header tank 2 located leftward of the inlet 45, the cutoff member 41, and the partition wall 35.

Communication is established between the third section 21 of the leeward lower header portion 7 and the fourth section 25 of the windward lower header portion 8 through a communication portion 40 provided in a portion of the partition portion 3a of the second header tank 3 located leftward of the partition wall 34.

Preferably, a relation B>A is satisfied, wherein A represents the total cross sectional area of the refrigerant passage holes 39 provided in the resistance member for flow division 36, and B represents the total cross sectional area of the refrigerant communication passages 30, which establish communication between the third section 17 of the leeward upper header portion 5 and the fourth section 23 of the windward upper header portion 6.

As a result of provision of the sections 15 to 19, 21, 23 to 26, the refrigerant inlet 22, the refrigerant outlet 27, the resistance member for flow division 36 having the refrigerant passage holes 39, the cutoff member 41, the first space 38, the second space 37, the resistance member for flow division 42 having the refrigerant passage holes 43, the flow promoting member 44, the upper space 26A, the lower space 26B, the communication paths 30, and the communication portion 40 as described above, refrigerant flows through the heat exchange tubes 9 of the first tube group 11A, the heat exchange tubes 9 of the third tube group 11C (the farthest tube group of the leeward tube row 11) located farthest from the refrigerant inlet 22, and the heat exchange tubes 9 of the fourth tube group 12A (the farthest tube group of the windward tube row 12) located farthest from the refrigerant outlet 27, from the upper or lower side where the refrigerant inlet 22 is located toward the opposite side (in the present embodiment, from the upper side toward the lower side). Thus, these tube groups 11A, 11C, 12A serve as downward flow tube groups. Further, refrigerant flows through the heat exchange tubes 9 of the second tube group 11B and the heat exchange tubes 9 of the fifth tube group 12B from the lower side to the upper side. Therefore, these tube groups 11B, 12B serve as upward flow tube groups. That is, the flow direction of refrigerant in the heat exchange tubes 9 of the third tube group 11C of the leeward tube row 11 is the same as the flow direction of refrigerant in the heat exchange tubes 9 of the fourth tube group 12A of the windward tube row 12. The first tube group 11A forms a first path 28, along which refrigerant flows through the heat exchange tubes 9 from the upper or lower side where the refrigerant inlet 22 is located toward the opposite side (in the present embodiment, from the upper side toward the lower side). The second tube group 11B forms a second path 29, along which refrigerant flows through the heat exchange tubes 9 from the lower side toward the upper side (in the direction opposite the flow direction in the first path 28). The third and fourth tube groups 11C, 12A form a third path 31, along which refrigerant flows through the heat exchange tubes 9 from the upper side toward the lower side (in the same direction as the flow direction in the first path 28). The fifth tube group 12B forms a fourth path 32, along which refrigerant flows through the heat exchange tubes 9 from the lower side toward the upper side (in the direction opposite the flow direction in the first path 28). Thus, the third path 31 is formed by the third and fourth tube groups 11C, 12A, which are juxtaposed in the air-passage direction and which are the same in terms of the flow direction of refrigerant within the heat exchange tubes 9. Refrigerant having flowed from the refrigerant inlet 22 flows through the heat exchange tubes 9 of the first to fourth paths 28, 29, 31, 32 along two routes which will be described below, and flows out from the refrigerant outlet 27. The first route extends through the first section 15, the first tube group 11A (the first path 28), the first section 18, the second section 19, the second tube group 11B (the second path 29), the second section 16, the second space 37 of the third section 17, the fourth section 23, the fourth tube group 12A (the third path 31), the fourth section 25, the lower space 26B of the fifth section 26, the upper space 26A of the same, the fifth tube group 12B (the fourth path 32), and the fifth section 24. The second route extends through the first section 15, the first tube group 11A (the first path 28), the first section 18, the second section 19, the second tube group 11B (the second path 29), the second section 16, the second space 37 of the third section 17, the first space 38 of the same, the third tube group 11C (the third path 31), the third section 21, the fourth section 25, the lower space 26B of the fifth section 26, the upper space 26A of the same, the fifth tube group 12B (the fourth path 32), and the fifth section 24.

The above-described evaporator 1, together with a compressor, a condenser serving as a refrigerant cooler, and an expansion valve serving as a pressure reducer, constitutes a refrigeration cycle which is installed in a vehicle, such as an automobile, as a car air conditioner. When the car air conditioner is operated, a two-phase refrigerant of vapor-liquid phase having passed through the compressor, the condenser, and the expansion valve enters the first section 15 of the leeward upper header portion 5 through the refrigerant inlet 22, successively flows through the heat exchange tubes 9 of the first to fourth paths 28, 29, 31, 32 along the two routes, and flows out from the refrigerant outlet 27.

While refrigerant flows through the heat exchange tubes 9 of the leeward tube row 11 and the heat exchange tubes 9 of the windward tube row 12, heat exchange is performed between the refrigerant and air passing through the air-passing clearances of the heat exchange core portion 4 (see the arrow X of FIG. 1), whereby the air is cooled, and the refrigerant flows out in the vapor phase.

The platelike resistance member for flow division 36 for dividing the interior of the third section 17 into the first space 38 and the second space 37 is provided in the third section 17 of the leeward upper header portion 5; and the resistance member for flow division 36 has the plurality of refrigerant passage holes 39 formed therein at predetermined intervals in the left-right direction. Therefore, refrigerant having flowed into the second space 37 receives a resistance which is produced by the resistance member for flow division 36 against the flow into the first space 38. Accordingly, even when the refrigerant receives the influence of the gravity, the refrigerant having flowed into the second space 37 of the third section 17 is restrained from flowing in a large amount into the heat exchange tubes 9 of the third tube group 11C of the leeward tube row 11, which forms the third path 31. Accordingly, it is possible to equalize the amount of refrigerant flowing into the heat exchange tubes 9 of the third tube group 11C via the first space 38 and the amount of refrigerant flowing into the heat exchange tubes 9 of the fourth tube group 12A of the windward tube row 12, which forms the third path 31, after having entered the fourth section 23 of the windward upper header portion 6 via the refrigerant communication passages 30. In the case where the above-described relation B>A is satisfied (A represents the total cross sectional area of the refrigerant passage holes 39 provided in the resistance member for flow division 36, and B represents the total cross sectional area of the refrigerant communication passages 30, which establish communication between the second space 37 of the third section 17 of the leeward upper header portion 5 and the fourth section 23 of the windward upper header portion 6), the amount of refrigerant flowing through the third tube group 11C and the amount of refrigerant flowing through the fourth tube group 12A are equalized effectively.

Figure 7:
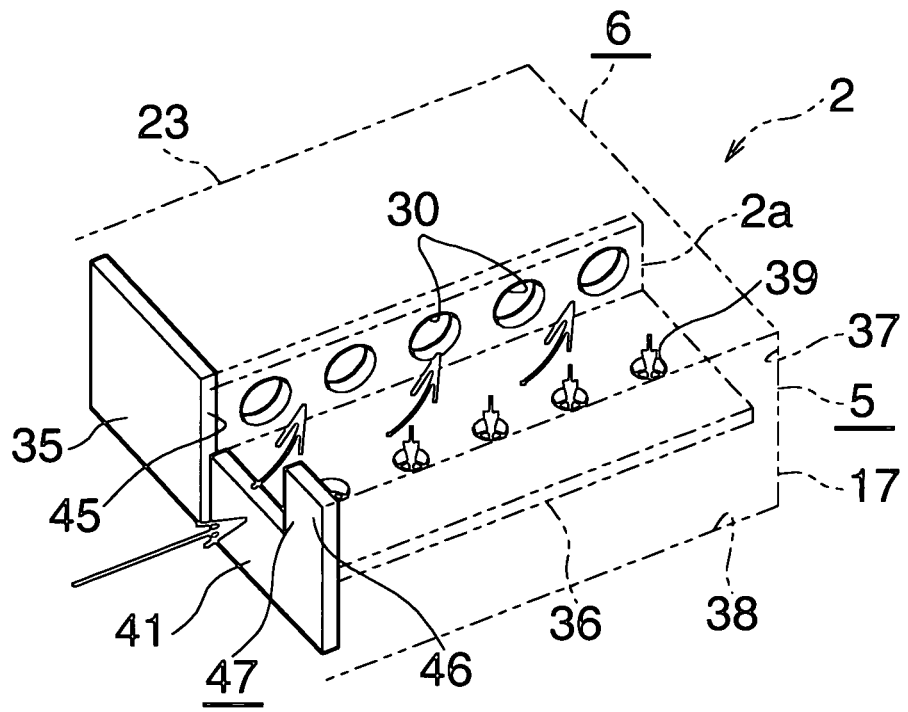
FIG. 7 is a partial perspective view showing a first modification of the leeward upper header portion of the evaporator of the first embodiment.
Figure 8:
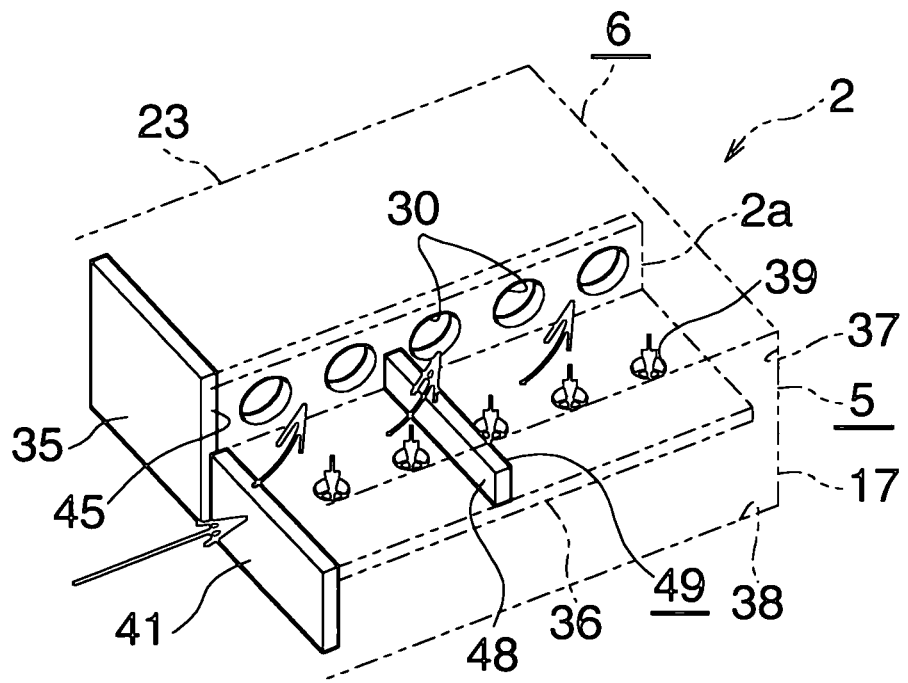
FIG. 8 is a partial perspective view showing a second modification of the leeward upper header portion of the evaporator of the first embodiment.
Figure 9:
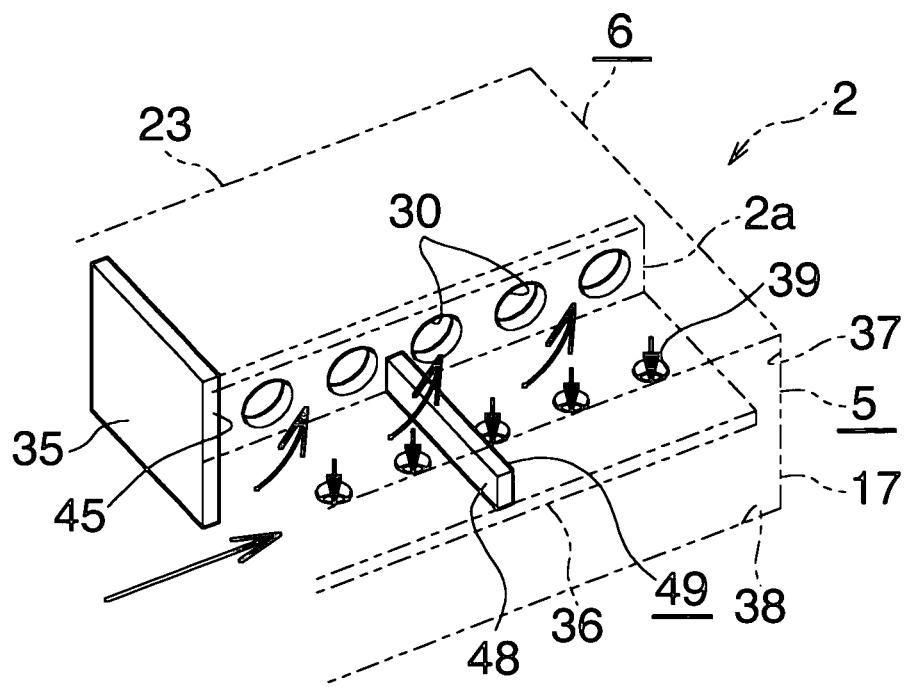
FIG. 9 is a partial perspective view showing a third modification of the leeward upper header portion of the evaporator of the first embodiment.
Figure 10:
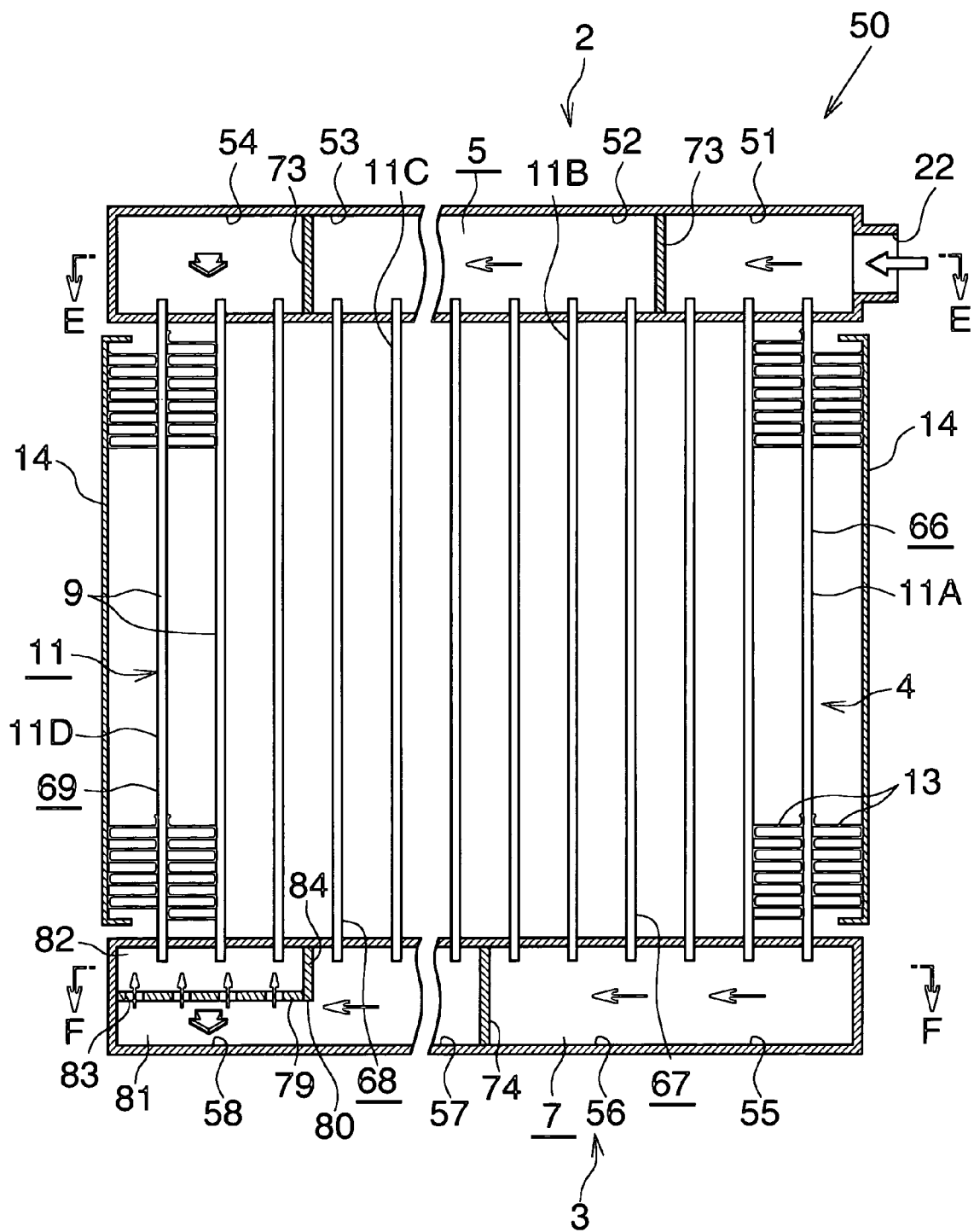
FIG. 10 is a partially omitted vertical cross section of leeward upper and lower header portions of an evaporator according to a second embodiment of the present invention, as viewed frontward from the rear side of the evaporator.
Figure 11:
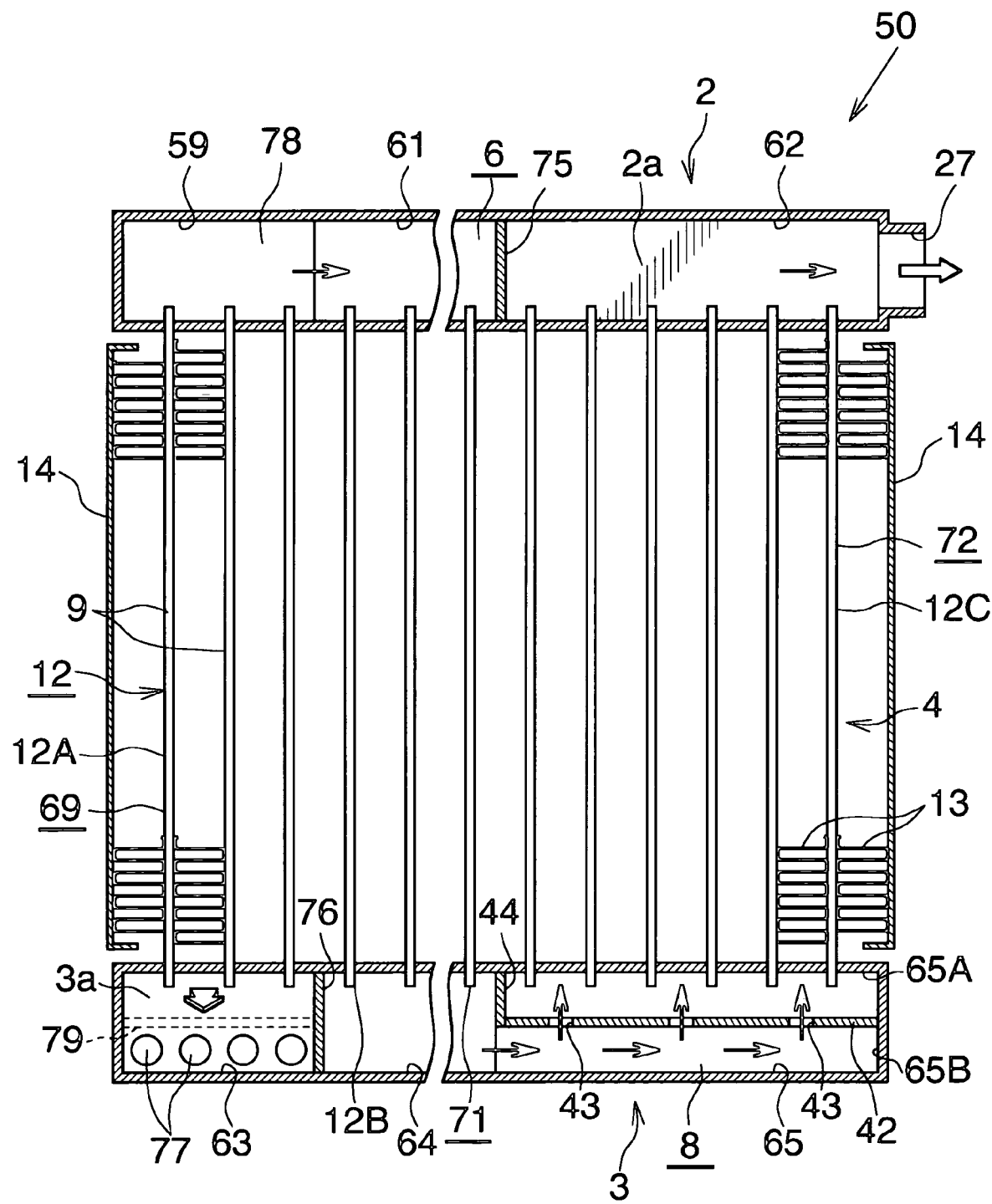
FIG. 11 is a partially omitted vertical cross section of windward upper and lower header portions of the evaporator according to the second embodiment of the present invention, as viewed frontward from the rear side of the evaporator.
Figure 12:
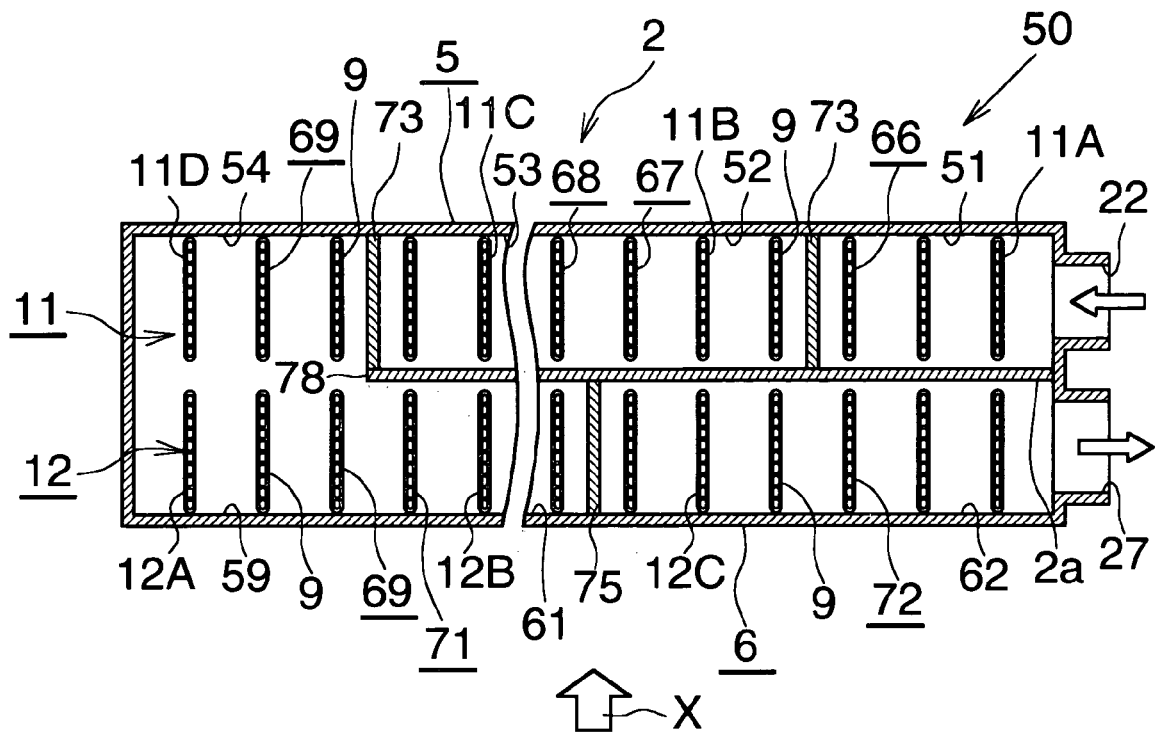
FIG. 12 is a sectional view taken along line E-E of FIG. 10.
Figure 13:
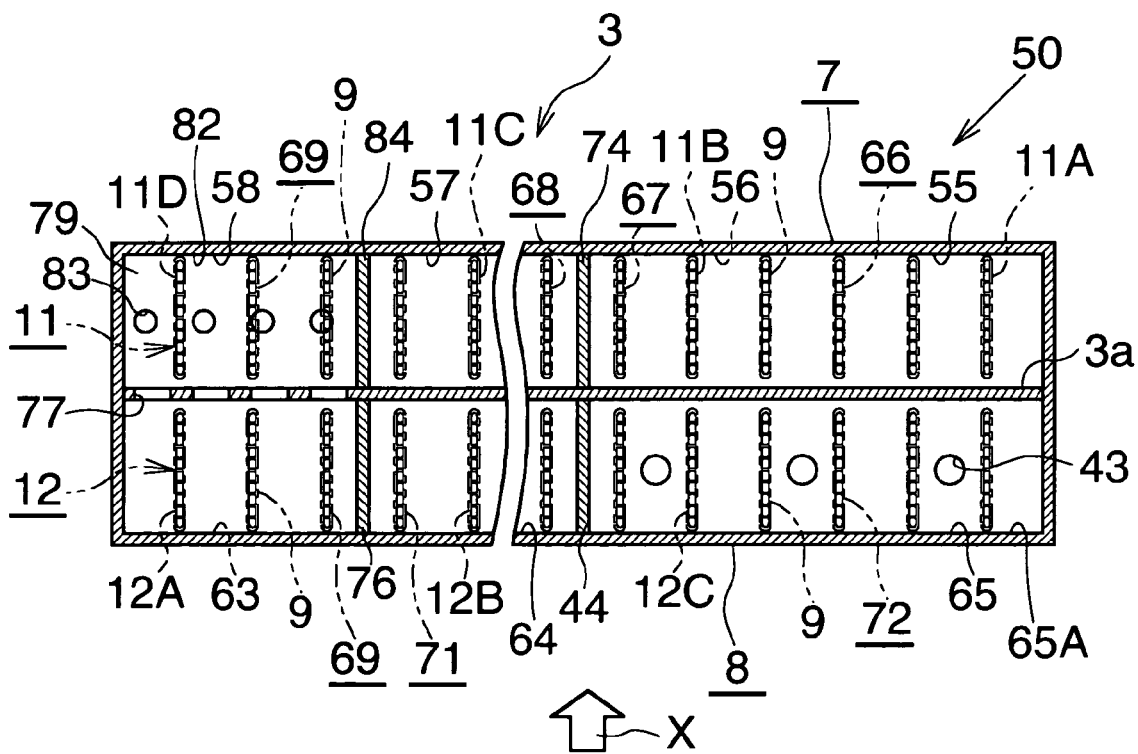
FIG. 13 is a sectional view taken along line F-F of FIG. 10.

FIGS. 7 to 9 show modifications of the leeward upper header portion 5.

In the case of the leeward upper header portion 5 shown in FIG. 7, on the leeward side of the inlet 45 of the second space 37 of the third section 17 (the leeward farthest section), an obstructing plate 46 for hindering inflow of refrigerant into a leeward portion of the second space 37 is provided over the entire height of the second space 37. The obstructing plate 46 serves as a promoting member 47 which promotes the flow of refrigerant from the second space 37 of the third section 17 into the fourth section 23 (the windward farthest section).

In the case of the leeward upper header portion 5 shown in FIG. 8, at a lower portion (a portion on the side toward the heat exchange tubes 9) of an intermediate portion (with respect to the left-right direction, along which the heat exchange tubes 9 are arranged) of the second space 37 of the third section 17 (the leeward farthest section); an obstructing plate 48 for preventing inflow of refrigerant toward a region of the second space 37, which region is located on the side toward the heat exchange tubes 9, is provided over the entire width of the second space 37 with respect to the front-rear direction. The obstructing plate 48 serves as a promoting member 49 which promotes the flow of refrigerant from the second space 37 of the third section 17 into the fourth section 23 (the windward farthest section).

The leeward upper header portion 5 shown in FIG. 9 is identical with the leeward upper header portion 5 shown in FIG. 8, excepting that the flow cutoff member 41, which closes the right end opening of the first space 38 of the third section 17 (the leeward farthest section) and prevents the flow of refrigerant from the second section 16 of the leeward upper header portion 5 into the first space 38, is not provided.

Notably, in the leeward upper header portion 5 shown in FIG. 9, a partition member for partitioning the first space 37 in the left-right direction may be provided at an intermediate portion (with respect to the left-right direction, along which the heat exchange tubes 9 are arranged) of the first space 38 of the third section 17. The partitioning member may be provided at the same position as the obstructing member 48, or provided at a position shifted from the position of the obstructing member 48.

Second Embodiment

Figure 14:
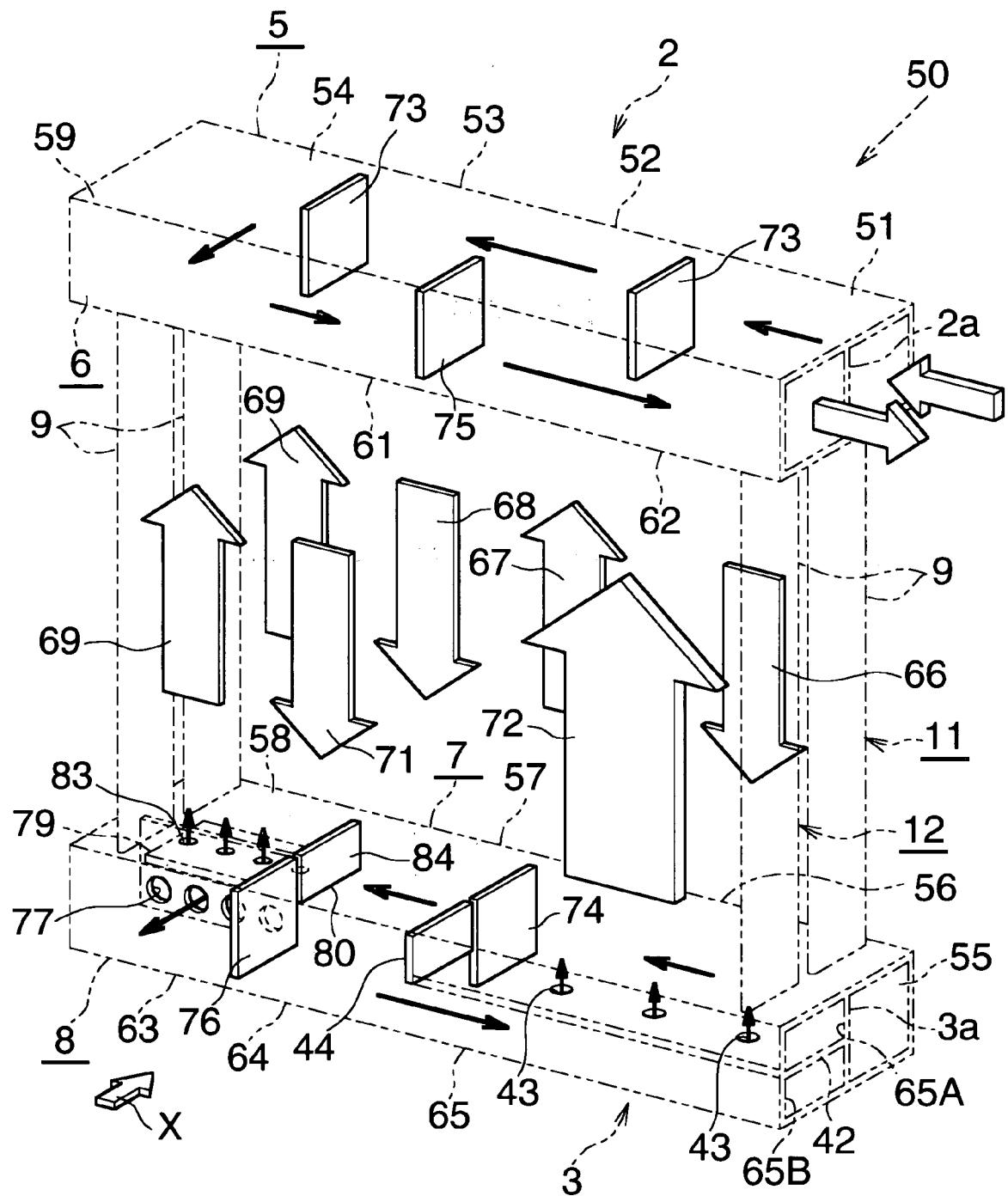
FIG. 14 is a view showing the flow of refrigerant within the evaporator of FIG. 10.

FIGS. 10 to 14 show a second embodiment of the present invention. FIGS. 10 to 13 show the configurations of essential portions of the evaporator, and FIG. 14 shows the flow of refrigerant within the evaporator of FIG. 10.

As shown in FIGS. 10 to 14, the leeward tube row 11 of the evaporator 50 includes four tube groups 11A, 11B, 11C, 11D, each of which is composed of a plurality of heat exchange tubes 9 and which are arranged from the right end toward the left end; and the windward tube row 12 includes three tube groups 12A, 12B, 12C (the number of which is one less than the number of the tube groups of the leeward tube row 11), each of which is composed of a plurality of heat exchange tubes 9 and which are arranged from the left end toward the right end.

The leeward upper and lower header portions 5, 7 have sections 51, 52, 53, 54 and sections 55, 56, 57, 58 respectively, the number of which is equal to the number of the tube groups 11A, 11B, 11C, 11D of the leeward tube row 11 and which communicate with the heat exchange tubes 9 of the tube groups 11A, 11B, 11C, 11D, respectively. A refrigerant inlet 22 is provided at the right end of the right end section 51 of the leeward upper header portion 5. The four tube groups 11A, 11B, 11C, 11D of the leeward tube row 11 will be referred to as the first to fourth tube groups, from the end where the refrigerant inlet 22 is provided toward the opposite end. The sections 51, 52, 53, 54 and the sections 55, 56, 57, 58, with which the heat exchange tubes 9 of the first to fourth tube groups 11A, 11B, 11C, 11D communicate, will be referred to as the first to fourth sections, from the end where the refrigerant inlet 22 is provided toward the opposite end. The fourth tube group 11D is the farthest tube group of the leeward tube row 11 located farthest from the refrigerant inlet 22; and the fourth section 58 of the leeward upper header portion 5 is the leeward farthest section which is located on the upstream side with respect to the refrigerant flow direction (on the upper side) and with which the heat exchange tubes 9 of the fourth tube groups 11D communicate.

The windward upper and lower header portions 6, 8 have sections 59, 61, 62 and sections 63, 64, 65, respectively, the number of which is equal to the number of the tube groups 12A, 12B, 12C of the windward tube row 12 and which communicate with the heat exchange tubes 9 of the tube groups 12A, 12B, 12C, respectively. A refrigerant outlet 27 is provided at the right end of the right end section 64 of the windward upper header portion 6 (at the end where the refrigerant inlet 22 is provided). The three tube groups 12A, 12B, 12C of the windward tube row 12 will be referred to as the fifth to seventh tube groups, from the end opposite the refrigerant outlet 27 toward the end where the refrigerant outlet 27 is provided; and the sections 59, 61, 62 and the sections 63, 64, 65 with which the heat exchange tubes 9 of the fifth to seventh tube groups 12A, 12B, 12C communicate, will be referred to as the fifth to seventh sections, from the end opposite the refrigerant outlet 27 toward the end where the refrigerant outlet 27 is provided. The fifth tube group 12A is the farthest tube group of the windward tube row 12 located farthest from the refrigerant outlet 27; and the fifth section 63 of the windward upper header portion 6 is the windward farthest section which is located on the upstream side with respect to the refrigerant flow direction (on the upper side) and with which the heat exchange tubes 9 of the fifth tube group 12A communicate.

Notably, the total number of the heat exchange tubes 9 which constitute the first and second tube groups 11A, 11B of the leeward tube row 11 is equal to the number of the heat exchange tubes 9 which constitute the seventh tube group 12C of the windward tube row 12; the number of the heat exchange tubes 9 which constitute the third tube group 11C of the leeward tube row 11 is equal to the number of the heat exchange tubes 9 which constitute the sixth tube group 12B of the windward tube row 12; and the number of the heat exchange tubes 9 which constitute the fourth tube group 11D of the leeward tube row 11 is equal to the number of the heat exchange tubes 9 which constitute the fifth tube group 12A of the windward tube row 12. Furthermore, the respective total lengths (as measured in the left-right direction) of the first sections 51, 55 and the second sections 52, 56 of the leeward upper and lower header portions 5, 7 are equal to the respective lengths (as measured in the left-right direction) of the seventh sections 62, 65 of the windward upper and lower header portions 6, 8; and the respective lengths (as measured in the left-right direction) of the third sections 53, 57 and the fourth sections 54, 58 of the leeward upper and lower header portions 5, 7 are equal to those of the sixth sections 61, 64 and the fifth sections 59, 63 of the windward upper and lower header portions 6, 8.

A partition wall 73 is provided between the first section 51 and the second section 52 of the leeward upper header portion 5 and between the third section 53 and the fourth section 54 thereof, whereby communication between the first and second sections 51, 52 and communication between the third and fourth sections 53, 54 are prohibited. Communication is established between the second section 52 and the third section 53 of the windward upper header portion 5.

Communication is established between the first section 55 and the second section 56 of the windward lower header portion 7. A partition wall 74 is provided between the second section 56 and the third section 57 of the leeward lower header portion 7, whereby communication between the two sections section 56, 57 is prohibited. Furthermore, a resistance member for flow division 79 is provided within the fourth section 58 (the leeward farthest section) of the leeward lower header portion 7 so as to divide the interior of the fourth section 58 into an upper first space 82 which the heat exchange tubes 9 face, and a lower second space 81 separated from the first space 82. A flow cutoff member 84 is provided between the third section 57 and the fourth section 58 of the leeward lower header portion 7 so as to close the right end opening of the first space 82 of the fourth section 58 and prevents the flow of refrigerant from the third section 57 into the first space 82. The right end of the second space 81 of the fourth section 58 is fully opened, whereby communication is established between the third section 57 and the second space 81 of the fourth section 58. Therefore, refrigerant flows into the second space 81 of the fourth section 58 from the third section 57, which is adjacent to the fourth section 58 with respect to the direction toward the refrigerant inlet 22. The opening at the right end of the second space 81 of the fourth section 58 serves as an inlet 80, through which refrigerant flows into the second space 81 of the fourth section 58. Furthermore, a plurality of refrigerant passage holes 83 are formed in the resistance member for flow division 79 at predetermined intervals in the left-right direction, whereby communication is established between the two spaces 81, 82.

Communication is established between the fifth section 59 and the sixth section 61 of the windward upper header portion 6. A partition wall 75 is provided between the sixth section 61 and the seventh section 62 of the windward upper header portion 6, whereby communication between the two sections 61, 62 is prohibited.

A partition wall 76 is provided between the fifth section 63 and the sixth section 64 of the windward lower header portion 8, whereby communication between the two sections 63, 64 is prohibited. A platelike resistance member for flow division 42 is provided within the seventh section 65 of the windward lower header portion 8 so as to divide the interior of the seventh section 65 into an upper space 65A and a lower space 65B. A plurality of refrigerant passage holes 43 are formed in the resistance member for flow division 42 at predetermined intervals in the left-right direction. Furthermore, a platelike flow promoting member 44 is provided between the sixth section 64 and the seventh section 65 of the windward lower header portion 8 so as to close the left end opening of the upper space 65A of the seventh section 65, to thereby promote the flow of refrigerant from the sixth section 64 toward the lower space 65B of the seventh section 65. Furthermore, the left end of the lower space 65B of the seventh section 65 is fully opened, whereby communication is established between the sixth section 64 and the lower space 65B of the seventh section 65. Therefore, refrigerant flows into the lower space 65B of the seventh section 65 from the sixth section 64. Notably, a refrigerant passage hole(s) may be formed in the flow promoting member 44.

Communication is established between the fourth section 54 of the leeward upper header portion 5 and the fifth section 59 of the windward upper header portion 6 through a communication portion 78 provided in a portion of the partition portion 2a of the first header tank 2 located leftward of the partition wall 73.

Communication is established between the second space 81 of the fourth section 58 of the leeward lower header portion 7 and the fifth section 63 of the windward lower header portion 8 through a plurality of communication paths 77 (through holes) provided at predetermined intervals (in the left-right direction) in a portion of the partition portion 3a of the second header tank 3 located leftward of the inlet 80, the cutoff member 84, and the partition wall 76.

Preferably, a relation B>A is satisfied, wherein A represents the total cross sectional area of the refrigerant passage holes 83 provided in the resistance member for flow division 79, and B represents the total cross sectional area of the refrigerant communication passages 77, which establish communication between the fourth section 58 of the leeward lower header portion 7 and the fifth section 63 of the windward lower header portion 8.

As a result of provision of the sections 51 to 59, 61 to 65, the refrigerant inlet 22, the refrigerant outlet 27, the resistance member for flow division 79 having the refrigerant passage holes 83, the cutoff member 84, the first space 82, the second space 81, the resistance member for flow division 42 having the refrigerant passage holes 43, the flow promoting member 44, the upper space 65A, the lower space 65B, the communication paths 77, and the communication portion 78 as described above, refrigerant flows through the heat exchange tubes 9 of the first tube group 11A, the heat exchange tubes 9 of the third tube group 11C, and the heat exchange tubes 9 of the sixth tube group 12B from the upper or lower side where the refrigerant inlet 22 is located toward the opposite side (in the present embodiment, from the upper side toward the lower side). Thus, these tube groups 11A, 11C, 12B serve as downward flow tube groups. Further, refrigerant flows through the heat exchange tubes 9 of the second tube group 11B, the heat exchange tubes 9 of the fourth tube group 11D located farthest from the refrigerant inlet 22, the heat exchange tubes 9 of the fifth tube group 12A located farthest from the refrigerant outlet 27, and the seventh tube group 12C, from the lower side to the upper side. Therefore, these tube groups 11B, 11D, 12A, 12C serve as upward flow tube groups. That is, the flow direction of refrigerant in the heat exchange tubes 9 of the fourth tube group 11D of the leeward tube row 11 is the same as the flow direction of refrigerant in the heat exchange tubes 9 of the fifth tube group 12A of the windward tube row 12. The first tube group 11A forms a first path 66, along which refrigerant flows through the heat exchange tubes 9 from the upper or lower side where the refrigerant inlet 22 is located toward the opposite side (in the present embodiment, from the upper side toward the lower side). The second tube group 11B forms a second path 67, along which refrigerant flows through the heat exchange tubes 9 from the lower side toward the upper side (in the direction opposite the flow direction in the first path 66). The third tube group 11C forms a third path 68, along which refrigerant flows through the heat exchange tubes 9 from the upper side toward the lower side (in the same direction as the flow direction in the first path 66). The fourth and fifth tube groups 11D, 12A form a fourth path 69, along which refrigerant flows through the heat exchange tubes 9 from the lower side toward the upper side (in the direction opposite the flow direction in the first path 66). The sixth tube group 12B forms a fifth path 71, along which refrigerant flows through the heat exchange tubes 9 from the upper side toward the lower side (in the same direction as the flow direction in the first path 66). The seventh tube group 12C forms a sixth path 72, along which refrigerant flows through the heat exchange tubes 9 from the lower side toward the upper side (in the direction opposite the flow direction in the first path 66). Thus, the fourth path 69 is formed by the fourth and fifth tube groups 11D, 12A, which are juxtaposed in the air-passage direction and which are the same in terms of the flow direction of refrigerant within the heat exchange tubes 9. Refrigerant having flowed from the refrigerant inlet 22 flows through the heat exchange tubes 9 of the first to sixth paths 66, 67, 68, 69, 71, 72 successively along two routes which will be described below, and flows out from the refrigerant outlet 27. The first route extends through the first section 51, the first tube group 11A (the first path 66), the first section 55, the second section 56, the second tube group 11B (the second path 67), the second section 52, the third section 53, the third tube group 11C (the third path 68), the third section 57, the second space 81 of the fourth section 58, the fifth section 63, the fifth tube group 12A (the fourth path 69), the fifth section 59, the sixth section 61, the sixth tube group 12B (the fifth path 71), the sixth section 64, the lower space 65B of the seventh section 65, the upper space 65A of the same, the seventh tube group 12C (the sixth path 32), and the seventh section 62. The second route extends through the first section 51, the first tube group 11A (the first path 66), the first section 55, the second section 56, the second tube group 11B (the second path 67), the second section 52, the third section 53, the third tube group 11C (the third path 68), the third section 57, the second space 81 of the fourth section 58, the first space 82 of the same, the fourth tube group 11D (the fourth path 69), the fourth section 54, the fifth section 59, the sixth section 61, the sixth tube group 12B (the fifth path 71), the sixth section 64, the lower space 65B of the seventh section 65, the upper space 65A of the same, the seventh tube group 12C (the sixth path 32), and the seventh section 62.

The above-described evaporator 1, together with a compressor, a condenser serving as a refrigerant cooler, and an expansion valve serving as a pressure reducer, constitutes a refrigeration cycle which is installed in a vehicle, such as an automobile, as a car air conditioner. When the car air conditioner is operated, a two-phase refrigerant of vapor-liquid phase having passed through the compressor, the condenser, and the expansion valve enters the first section 51 of the leeward upper header portion 5 through the refrigerant inlet 22, successively flows through the heat exchange tubes 9 of the first to sixth paths 66, 67, 68, 69, 71, 72 along the two routes, and flows out from the refrigerant outlet 27.

While refrigerant flows through the heat exchange tubes 9 of the leeward tube row 11 and the heat exchange tubes 9 of the windward tube row 12, heat exchange is performed between the refrigerant and air passing through the air-passing clearances of the heat exchange core portion 4 (see the arrow X of FIG. 1), whereby the air is cooled, and the refrigerant flows out in the vapor phase.

The platelike resistance member for flow division 79 for dividing the interior of the fourth section 58 into the first space 82 and the second space 81 is provided in the fourth section 58 of the leeward lower header portion 7; and the resistance member for flow division 79 has the plurality of refrigerant passage holes 83 formed therein at predetermined intervals in the left-right direction. Therefore, refrigerant having flowed into the second space 81 receives a resistance which is produced by the resistance member for flow division 79 against the flow into the first space 82. Accordingly, even when the flow rate of refrigerant changes, the refrigerant having flowed into the second space 81 of the fourth section 58 is restrained from flowing in a large amount into the heat exchange tubes 9 of the fourth tube group 11D of the leeward tube row 11, which forms the fourth path 69. Accordingly, it is possible to equalize the amount of refrigerant flowing into the heat exchange tubes 9 of the fourth tube group 11D via the first space 82 and the amount of refrigerant flowing into the heat exchange tubes 9 of the fifth tube group 12A of the windward tube row 12, which forms the fourth path 69, after having entered the fifth section 63 of the windward lower header portion 8 via the refrigerant communication passages 77. In the case where the above-described relation B>A is satisfied (A represents the total cross sectional area of the refrigerant passage holes 83 provided in the resistance member for flow division 79, and B represents the total cross sectional area of the refrigerant communication passages 77, which establish communication between the second space 81 of the fourth section 58 of the leeward lower header portion 7 and the fifth section 63 of the windward lower header portion 8), the amount of refrigerant flowing through the fourth tube group 11D and the amount of refrigerant flowing through the fifth tube group 12A are equalized effectively.

In the second embodiment, any one of the promoting members shown in FIGS. 7 to 9 may be provided in the leeward lower header portion 7.

Third Embodiment

Figure 15:
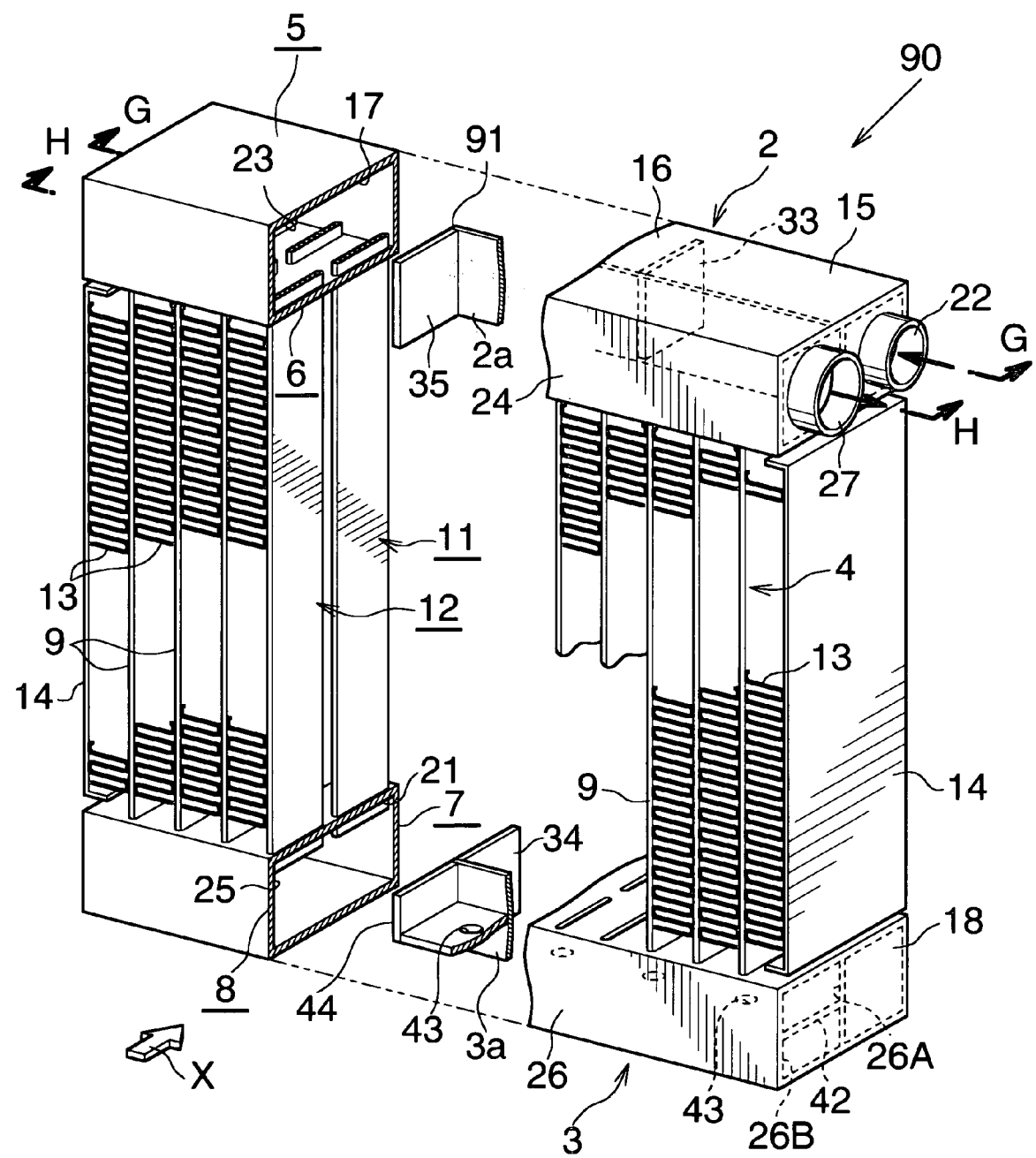
FIG. 15 is a partially cut-away perspective view showing the overall structure of an evaporator according to a third embodiment of the present invention.
Figure 16:
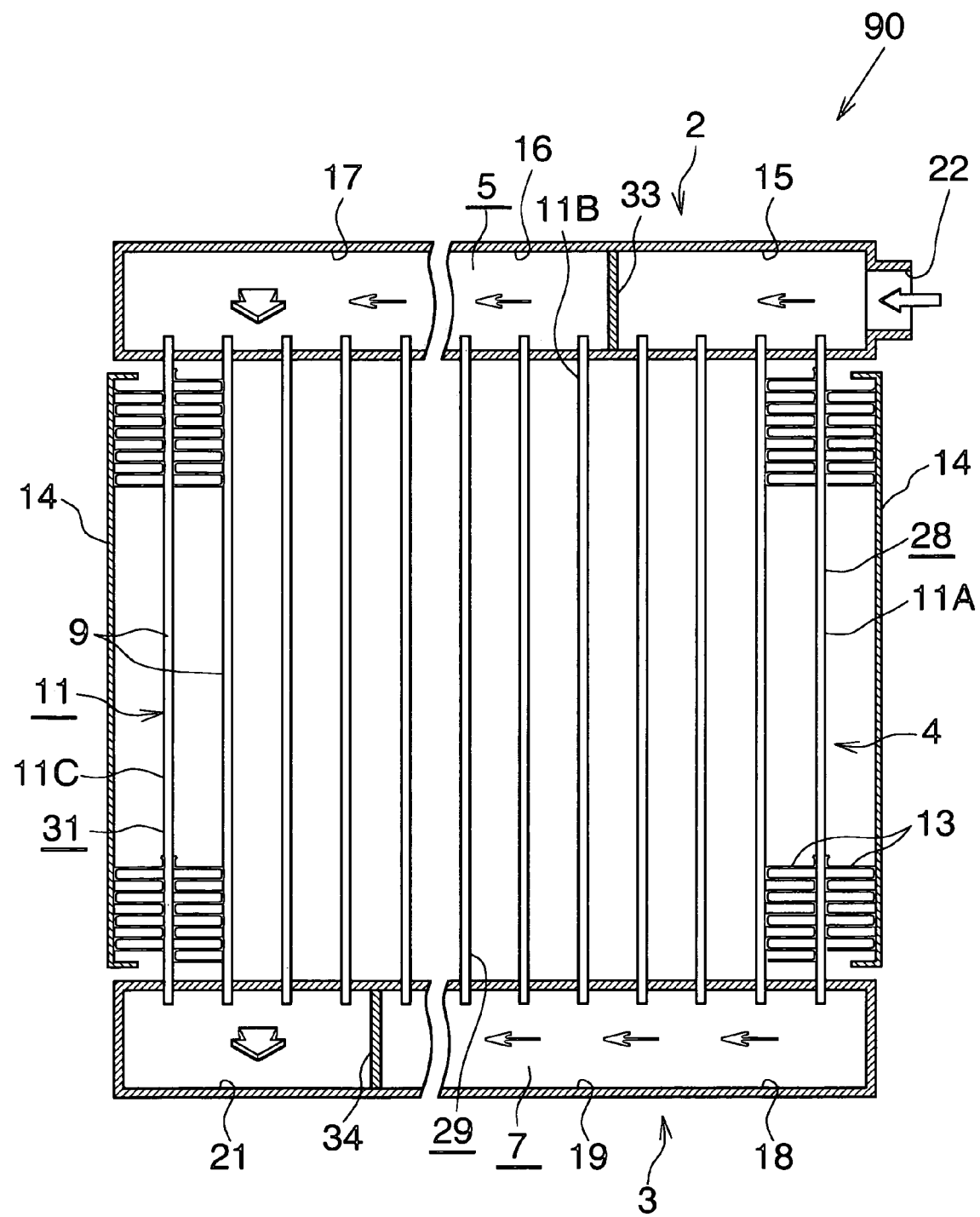
FIG. 16 is a partially omitted sectional view taken along line G-G of FIG. 15.
Figure 17:
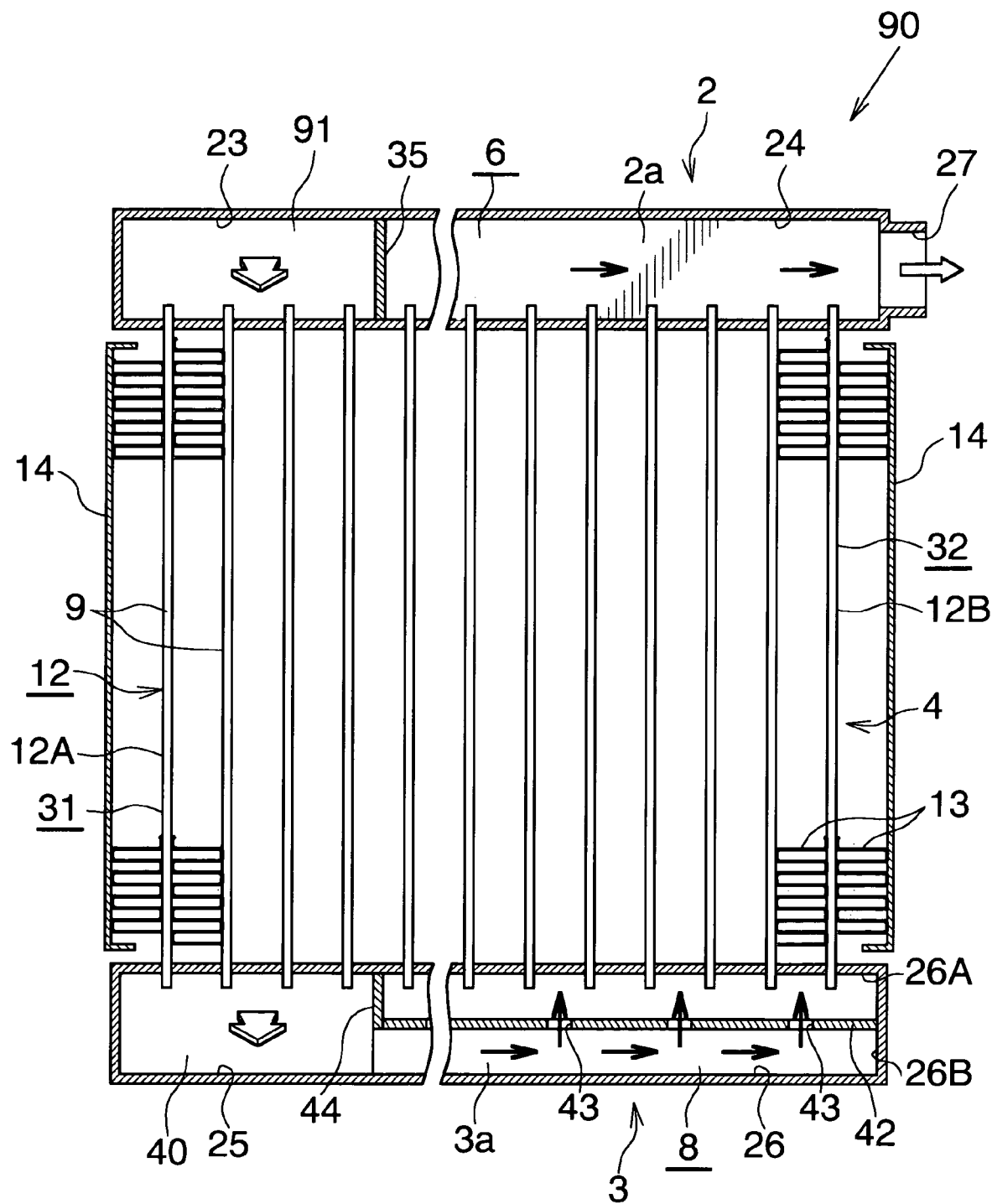
FIG. 17 is a partially omitted sectional view taken along line H-H of FIG. 15.

FIGS. 15 to 17 show a third embodiment of the present invention. FIGS. 15 to 17 show the configurations of essential portions of the evaporator.

As shown in FIGS. 15 to 17, the resistance member for flow division 36 is not provided in the third section 17 (the leeward farthest section) of the leeward upper header portion 5 of an evaporator 90, and the flow cutoff member 41 is not provided between the second section 16 and the third section 17 of the leeward upper header portion 5. Accordingly, the second section 16 and the third section 17 communicate with each other over the entire cross section. Furthermore, a communication portion 91 provided in a portion of the partition portion 2a of the first header tank 2 located leftward of the partition wall 35 establishes communication between the third section 17 of the leeward upper header portion 5 and the fourth section 23 of the windward upper header portion 6.

The total channel sectional area of the refrigerant channels of the heat exchange tubes 9 of the fifth tube group 12B, which form the entirety of the fourth path 32, is at least 60% of the total channel sectional area of the refrigerant channels of the heat exchange tubes 9 of the fourth tube group 12A (the windward farthest tube group), which forms the third path 31. Each of the total channel sectional area of the refrigerant channels of the heat exchange tubes 9 which form the second path 29 and the total channel sectional area of the refrigerant channels of the heat exchange tubes 9 which form the third path 31 is equal to or greater than the total channel sectional area of the refrigerant channels of the heat exchange tubes 9 which form the path 28, 29 located immediately before the corresponding path 29, 31. The total channel sectional area of the refrigerant channels of the heat exchange tubes 9 which form the fourth path 32 is greater than the total channel sectional area of the refrigerant channels of the heat exchange tubes 9 which form the third path 31. Notably, preferably, each of the total channel sectional area of the refrigerant channels of the heat exchange tubes 9 which form the second path 29 and the total channel sectional area of the refrigerant channels of the heat exchange tubes 9 which form the third path 31 is greater than the total channel sectional area of the refrigerant channels of the heat exchange tubes 9 which form the path 28, 29 located immediately before the corresponding path 29, 31.

Furthermore, the total channel sectional area of the refrigerant channels of the heat exchange tubes 9 of the third tube group 11C (the leeward farthest tube group), which forms the third path 31, is equal to the total channel sectional area of the refrigerant channels of the heat exchange tubes 9 of the fourth tube group 12A (the windward farthest tube group), which forms the third path 31. Each of the total channel sectional area of the refrigerant channels of the heat exchange tubes 9 of the third tube group 11C and the total channel sectional area of the refrigerant channels of the heat exchange tubes 9 of the fourth tube group 12A is smaller than the total channel sectional area of the refrigerant channels of the heat exchange tubes 9 which form the second path 29.

All the heat exchange tubes 9 have the same structure, and are identical with one another in terms of the number of the refrigerant channels and the total channel cross sectional area of the plurality of refrigerant channels. Through adjustment of the number of the heat exchange tubes 9 which form each of the first to fourth paths 28, 29, 31, 32, the total channel sectional area of the refrigerant channels of the heat exchange tubes 9 which form each of the first to fourth paths 28, 29, 31, 32 is determined. That is, the number of the heat exchange tubes 9 which form the fourth path 32 is at least 60% of the number of the heat exchange tubes 9 of the fourth tube group 12A (the upstream tube group) which forms the third path 31. Each of the number of the heat exchange tubes 9 which form the second path 29 and the number of the heat exchange tubes 9 which form the third path 31 is equal to or greater than the number of the heat exchange tubes 9 which form the path 28, 29 located immediately before the corresponding path 29, 31. The number of the heat exchange tubes 9 which form the fourth path 32 is greater than the number of the heat exchange tubes 9 which form the third path 31. The number of the heat exchange tubes 9 of the third tube group 11C which form the third path 31 is equal to the number of the heat exchange tubes 9 of the fourth tube group 12A which form the third path 31. Each of the number of the heat exchange tubes 9 which form the third tube group 11C and the number of the heat exchange tubes 9 which form the fourth tube group 12A is less than the number of the heat exchange tubes 9 which form the second path 28.

The structure of the remaining portion of the evaporator 90 is identical with that of the evaporator 1 of the first embodiment.

In the evaporator 90, refrigerant having flowed from the refrigerant inlet 22 flows through the heat exchange tubes 9 of the first to fourth paths 28, 29, 31, 32 successively along two routes which will be described below, and flows out from the refrigerant outlet 27. The first route extends through the first section 15, the first tube group 11A (the first path 28), the first section 18, the second section 19, the second tube group 11B (the second path 29), the second section 16, the third section 17, the fourth section 23, the fourth tube group 12A (the third path 31), the fourth section 25, the lower space 26B of the fifth section 26, the upper space 26A of the same, the fifth tube group 12B (the fourth path 32), and the fifth section 24. The second route extends through the first section 15, the first tube group 11A (the first path 28), the first section 18, the second section 19, the second tube group 11B (the second path 29), the second section 16, the third section 17, the third tube group 11C (the third path 31), the third section 21, the fourth section 25, the lower space 26B of the fifth section 26, the upper space 26A of the same, the fifth tube group 12B (the fourth path 32), and the fifth section 24.

In the above-described evaporator 1 of the first embodiment, as in the case of the evaporator 90 of the third embodiment, the total channel sectional area of the refrigerant channels of the heat exchange tubes 9 of the fifth tube group 12B, which forms the entire fourth path 32, is preferably at least 60% of the total channel sectional area of the refrigerant channels of the heat exchange tubes 9 of the fourth tube group 12A (the windward farthest tube group), which forms the third path 31. Furthermore, preferably, each of the total channel sectional area of the refrigerant channels of the heat exchange tubes 9 which form the second path 29 and the total channel sectional area of the refrigerant channels of the heat exchange tubes 9 which form the third path 31 is equal to or greater than the total channel sectional area of the refrigerant channels of the heat exchange tubes 9 which form the path 28, 29 located immediately before the corresponding path 29, 31; and the total channel sectional area of the refrigerant channels of the heat exchange tubes 9 which form the fourth path 32 is greater than the total channel sectional area of the refrigerant channels of the heat exchange tubes 9 which forms the third path 31. Notably, preferably, each of the total channel sectional area of the refrigerant channels of the heat exchange tubes 9 which form the second path 29 and the total channel sectional area of the refrigerant channels of the heat exchange tubes 9 which form the third path 31 is greater than the total channel sectional area of the refrigerant channels of the heat exchange tubes 9 which form the path 28, 29 located immediately before the corresponding path 29, 31.

Furthermore, preferably, the total channel sectional area of the refrigerant channels of the heat exchange tubes 9 of the third tube group 11C (the leeward farthest tube group), which forms the third path 31, is equal to the total channel sectional area of the refrigerant channels of the heat exchange tubes 9 of the fourth tube group 12A (the windward farthest tube group), which forms the third path 31; and each of the total channel sectional area of the refrigerant channels of the heat exchange tubes 9 of the third tube group 11C and the total channel sectional area of the refrigerant channels of the heat exchange tubes 9 of the fourth tube group 12A is smaller than the total channel sectional area of the refrigerant channels of the heat exchange tubes 9 which form the second path 29. That is, as in the case of the evaporator 90 of the third embodiment, there are used the heat exchange tubes 9 which have the same structure, and are identical with one another in terms of the number of the refrigerant channels and the total channel cross sectional area of the plurality of refrigerant channels. Therefore, through adjustment of the number of the heat exchange tubes 9 which form each of the first to fourth paths 28, 29, 31, 32, the total channel sectional area of the refrigerant channels of the heat exchange tubes 9 which form each of the first to fourth paths 28, 29, 31, 32 is determined.

Also, preferably, the above-described evaporator 50 of the second embodiment is configured in the above-described manner.

In the drawings showing the above-described three embodiments, the dimension of the evaporator, the number of the heat exchange tubes, and the pitch of the heat exchange tubes, etc. differ from the actual dimension, number, pitch, etc.

In the above-described three embodiments, the header portion located on the upstream side with respect to the flow direction of the first path and the header portion located on the downstream side with respect to the flow direction are provided such that the former is located on the upper side. However, the present invention is not limited thereto, and the header portion located on the upstream side with respect to the flow direction of the first path and the header portion located on the downstream side with respect to the flow direction may be provided such that the former is located on the lower side. That is, these two header portions may be provided in a vertically reversed manner, as compared with the above-described embodiments.

The evaporator of the present invention can be applied to a so-called laminated-type evaporator configured such that a plurality of flat hollow bodies each composed of a pair of dish-shaped plates which faces each other and are brazed together along the circumferential edges thereof are disposed in parallel. Each flat hollow body has two vertically extending heat exchange tubes which are juxtaposed in the air-passage direction, and header forming portions which communicate with the upper and lower ends, respectively, of the two heat exchange tubes. The flat hollow bodies are brazed together such that the upper header forming portions of all the flat hollow bodies communicate with one another and the lower header forming portions of all the flat hollow bodies communicate with one another, whereby two tube rows each including a plurality of heat exchange tubes which extend vertically and are spaced from one another in a direction perpendicular to the air-passage direction are juxtaposed in the air-passage direction. The header forming portions of all the flat hollow bodies form the leeward upper and lower header portions and the windward upper and lower header portions which communicate with the upper and lower ends of the leeward tube row and the upper and lower ends of the windward tube row, respectively.

What is claimed is:

1. An evaporator comprising:
  a leeward upper header portion, leeward with respect to an airflow;
  a leeward lower header portion, leeward with respect to the airflow;
  leeward heat exchange tubes each of which has a longitudinal direction and which are provided between the leeward upper header portion and the leeward lower header portion, each of the leeward heat exchange tubes having a leeward upper end and a leeward lower end opposite to the leeward upper end in the longitudinal direction, the leeward upper ends being connected to an inside of the leeward upper header portion, the leeward lower ends being connected to an inside of the leeward lower header portion, the leeward heat exchange tubes comprising:
    a first tube row which comprises first leeward heat exchange tubes among the leeward heat exchange tubes and in which refrigerant flows in a first direction along the longitudinal direction, the first tube row having a first flow passage sectional area which is a total flow passage sectional areas of the first leeward heat exchange tubes;
    a second tube row which comprises second leeward heat exchange tubes among the leeward heat exchange tubes and in which the refrigerant flowing from the first tube row flows in a second direction along the longitudinal direction opposite to the first direction, the second tube row having a second flow passage sectional area which is a total flow passage sectional areas of the second leeward heat exchange tubes and which is equal to or larger than the first flow passage sectional area; and a third tube row which comprises third leeward heat exchange tubes among the leeward heat exchange tubes and in which a first portion of the refrigerant flowing from the second tube row flows in the first direction, the third tube row having a third flow passage sectional area which is a total flow passage sectional areas of the third leeward heat exchange tubes;

a windward upper header portion provided to be juxtaposed to the leeward upper header portion, windward with respect to the airflow;

a windward lower header portion provided to be juxtaposed to the leeward lower header portion, windward with respect to the airflow; and windward heat exchange tubes provided between the windward upper header portion and the windward lower header portion to connect the windward upper header portion and the windward lower header portion, the windward heat exchange tubes comprising:

a fourth tube row which comprises fourth windward heat exchange tubes among the windward heat exchange tubes and in which a second portion of the refrigerant flowing from the second tube row flows in the first direction, the fourth tube row being provided to oppose the third tube row and having a fourth flow passage sectional area which is a total flow passage sectional areas of the fourth windward heat exchange tubes, a sum of the third flow passage sectional area and the fourth flow passage sectional area being equal to or larger than the second flow passage sectional area; and a fifth tube row which comprises fifth windward heat exchange tubes among the windward heat exchange tubes and in which the refrigerant flowing from the third tube row and fourth tube row flows in the second direction, the fifth tube row being provided to oppose the first tube row and the second tube row and having a fifth flow passage sectional area which is a total flow passage sectional areas of the fifth windward heat exchange tubes, the fifth flow passage sectional area being larger than the sum of the third flow passage sectional area and the fourth flow passage sectional area.

2. The evaporator according to claim 1, wherein the fifth flow passage sectional area is larger than 60% of the fourth flow passage sectional area.

3. The evaporator according to claim 1,
wherein the third flow passage sectional area is equal to the fourth flow passage sectional area,
wherein the third flow passage sectional area is smaller than the second flow passage sectional area, and
wherein the fourth flow passage sectional area is smaller than the second flow passage sectional area.

4. The evaporator according to claim 1, wherein each of the leeward heat exchange tubes and the windward heat exchange tubes has a substantially same flow passage sectional area, and wherein a number of the third leeward heat exchange tubes is equal to a number of the fourth windward heat exchange tubes.

5. The evaporator according to claim 1, wherein
the windward upper header portion and the leeward upper header portion are separated by an upper partition,
the windward lower header portion and the leeward lower header portion are separated by a lower partition,
the upper partition has an upper partition portion corresponding to a connection portion of the windward upper header portion to which the fourth windward heat exchange tubes are connected, the upper partition portion having an upper communication path via which the windward upper header portion is in communication with the leeward upper header portion, and
the lower partition has a lower partition portion corresponding to a connection portion of the windward lower header portion to which the fourth windward heat exchange tubes are connected, the lower partition portion having a lower communication path via which the windward lower header portion is in communication with the leeward lower header portion.

* * * * *